United States Patent
Hwang et al.

(10) Patent No.: US 11,051,250 B2
(45) Date of Patent: Jun. 29, 2021

(54) METHOD FOR TRANSMITTING/RECEIVING SIGNAL IN WIRELESS COMMUNICATION SYSTEM, AND DEVICE THEREFOR

(71) Applicant: LG Electronics Inc., Seoul (KR)

(72) Inventors: Seunggye Hwang, Seoul (KR); Changhwan Park, Seoul (KR); Joonkui Ahn, Seoul (KR); Sukhyon Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/006,156

(22) Filed: Aug. 28, 2020

(65) Prior Publication Data
US 2020/0396687 A1 Dec. 17, 2020

Related U.S. Application Data

(63) Continuation of application No. PCT/KR2019/010159, filed on Aug. 9, 2019.

(30) Foreign Application Priority Data

Aug. 9, 2018 (KR) .................. 10-2018-0093428
Sep. 22, 2018 (KR) .................. 10-2018-0114510

(51) Int. Cl.
*H04B 7/185* (2006.01)
*H04W 52/02* (2009.01)
(Continued)

(52) U.S. Cl.
CPC ..... *H04W 52/0229* (2013.01); *H04L 61/6054* (2013.01); *H04W 4/80* (2018.02);
(Continued)

(58) Field of Classification Search
CPC ............ H04W 52/0229; H04W 76/28; H04W 68/005; H04W 52/0219; H04W 76/11; H04W 4/80; H04L 61/6054
(Continued)

(56) References Cited

U.S. PATENT DOCUMENTS

2014/0211678 A1 7/2014 Jafarian et al.
2016/0374022 A1 12/2016 Ang et al.
2018/0054800 A1* 2/2018 Yeo ................ H04W 72/08

OTHER PUBLICATIONS

LG Electronics, "Discussion on wake up signal configurations and procedures in NB-IoT," R1-1806589, 3GPP TSG RAN WG1 Meeting #93, Busan, Korea, dated May 21-25, 2018, 11 pages.
(Continued)

*Primary Examiner* — Marcos Batista
(74) *Attorney, Agent, or Firm* — Fish & Richardson P.C.

(57) ABSTRACT

The present invention relates to a method for receiving a paging signal in a wireless communication system, and a device therefor, the method comprising the steps of: determining index information indicating a wake up signal (WUS) resource; and monitoring a WUS on the basis of the determined index information, wherein, when a user equipment (UE) supports machine type communication (MTC), the index information indicating the WUS resource is determined on the basis of identification information of the UE, parameters related to a discontinuous reception (DRX) cycle of the UE, information related to the number of paging narrowbands, and information related to the number of UE groups for the WUS.

15 Claims, 32 Drawing Sheets

(51) Int. Cl.
*H04W 4/80* (2018.01)
*H04W 76/28* (2018.01)
*H04W 76/11* (2018.01)
*H04L 29/12* (2006.01)
*H04W 68/00* (2009.01)

(52) U.S. Cl.
CPC ..... *H04W 52/0219* (2013.01); *H04W 68/005* (2013.01); *H04W 76/11* (2018.02); *H04W 76/28* (2018.02)

(58) Field of Classification Search
USPC .................................. 455/312; 370/318, 338
See application file for complete search history.

(56) References Cited

OTHER PUBLICATIONS

LG Electronics, "Discussion on wake up signal function in NB-IoT," R1-1802165, 3GPP TSG RAN WG1 Meeting #92, Athens, Greece, dated Feb. 26-Mar. 2, 2018, 5 pages.

PCT International Search Report in International Application No. PCT/KR2019/010159, dated Nov. 28, 2019, 12 pages (with English translation).

Qualcomm Incorporated, "Remaining issues on WUS configurations and procedures," R1-1807108, 3GPP TSG RAN WG1 #93, Busan, Korea, dated May 21-25, 2018, 11 pages.

Qualcomm Incorporated, "Wakeup Signal considerations," R2-1805608, 3GPP TSG RAN WG2 #101bis, Sanya, China, dated Apr. 16-20, 2018, 7 pages.

Sony, "WUS aspects on mobility," R2-1805163, 3GPP TSG-RAN WG2 Meeting #101b, Sanya, China, dated Apr. 16-20, 2018, 6 pages.

EP Extended European Search Report in European Appln. No. 19848045.1, dated Feb. 25, 2021, 11 pages.

Huawei, HiSilicon, "On wake-up signal for eFeMTC," R1-1805979, 3GPP TSG RAN WG1 Meeting #93, Busan, Korea, dated May 21-25, 2018, 5 pages.

Qualcomm Incorporated, "Further discussion on WUS configurations and procedures," R1-1802332, 3GPP TSG RAN WG1 Meeting #92, Athens, Greece, dated Feb. 26-Mar. 2, 2018, 6 pages.

* cited by examiner

In-band system

Guard-band system

Stand-alone system

METHOD FOR TRANSMITTING/RECEIVING SIGNAL IN WIRELESS COMMUNICATION SYSTEM, AND DEVICE THEREFOR

CROSS-REFERENCE TO RELATED APPLICATIONS

This application is a continuation of International Application No. PCT/KR2019/010159, filed on Aug. 9, 2019, which claims the benefit of Korean Application No. 10-2018-0114510, filed on Sep. 22, 2018, and Korean Application No. 10-2018-0093428, filed on Aug. 9, 2018. The disclosures of the prior applications are incorporated by reference in their entirety.

TECHNICAL FIELD

The present disclosure relates to a wireless communication system, and more specifically relates to a method of transmitting or receiving a wake up signal (WUS) and an apparatus therefor.

BACKGROUND

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

SUMMARY

An aspect of the present disclosure is to provide a method and apparatus for efficiently transmitting and receiving a wake-up signal (WUS).

Particularly, an aspect of the present disclosure is to provide a method and apparatus for reducing unnecessary paging monitoring operations of WUS-capable user equipments (UEs) by efficiently transmitting and receiving a WUS based on UE sub-grouping for WUS transmission and reception.

It will be appreciated by persons skilled in the art that the objects that could be achieved with the present disclosure are not limited to what has been particularly described hereinabove and the above and other objects that the present disclosure could achieve will be more clearly understood from the following detailed description.

In a first aspect of the present disclosure, provided herein is a method for receiving a paging signal by a user equipment (UE) in a wireless communication system, the method comprising: determining index information indicating a wake up signal (WUS) resource; and monitoring a WUS based on the determined index information, wherein when the UE supports machine type communication (MTC), the index information indicating the WUS resource is determined based on identification information of the UE, parameters related to a discontinuous reception (DRX) cycle of the UE, information about a number of paging narrowbands, and information about a number of UE groups for the WUS.

In a second aspect of the present disclosure, provided herein is a user equipment (UE) configured to receive a paging signal in a wireless communication system, the UE comprising: a radio frequency (RF) transceiver; and a processor operatively coupled to the RF transceiver, wherein the processor is configured to determine index information indicating a wake-up signal (WUS) resource, and monitor a WUS based on the determined index information, and wherein when the UE supports machine type communication (MTC), the index information indicating the WUS resource is determined based on identification information of the UE, parameters related to a discontinuous reception (DRX) cycle of the UE, information about a number of paging narrowbands, and information about a number of UE groups for the WUS.

In a third aspect of the present disclosure, provided herein is an apparatus for a user equipment (UE) in a wireless communication system, the apparatus comprising: a memory including executable codes; and a processor operatively coupled to the memory, wherein the processor is configured to perform specific operations by executing the executable codes, the specific operations comprising: determining index information indicating a wake-up signal (WUS) resource; and monitoring a WUS based on the determined index information, wherein when the UE supports machine type communication (MTC), the index information indicating the WUS resource is determined based on identification information of the UE, parameters related to a discontinuous reception (DRX) cycle of the UE, information about a number of paging narrowbands, and information about a number of UE groups for the WUS.

Preferably, the index information indicating the WUS resource is determined based on the following equation, $$c_g = \text{floor}(UE\_ID/(N*N_S*W)) \bmod N_{SG}$$

where $c_g$ represents the index information indicating the WUS resource, UE_ID represents the identification information of the UE, N and $N_s$ represent the parameters related to the DRX cycle of the UE, $N_n$ represents the information about the number of paging narrowbands, and $N_{SG}$ represents the information about the number of UE groups for the WUS.

Preferably, the UE_ID is determined based on international mobile subscriber identity (IMSI) information of the UE, N is determined based on min(T, nB) and $N_S$ is determined based on max(1, nB/T) where T represents the DRX cycle of the UE, nB is indicated through system information, min(A, B) represents a smaller value among A and B, and max(A, B) represents a larger value among A and B, and Nn is indicated by the system information.

Preferably, when the UE supports NarrowBand Internet of Things (NB-IoT), the index information indicating the WUS resource is determined based on the identification information of the UE, the parameters related to the DRX cycle of the UE, a sum of weights for paging carriers, and the information about the number of UE groups for the WUS.

Preferably, the index information indicating the WUS resource is determined based on the following equation, $$c_g = \text{floor}(UE\_ID/(N*N_S*W)) \bmod N_{SG}$$

where $c_g$ represents the index information indicating the WUS resource, UE_ID represents the identification information of the UE, N and $N_s$ represent the parameters related to the DRX cycle of the UE, W represents the sum of the weights for paging carriers, and $N_{SG}$ represents the information about the number of UE groups for the WUS.

Preferably, the UE_ID is determined based on international mobile subscriber identity (IMSI) information of the UE, N is determined based on min(T, nB) and Ns is determined based on max(1, nB/T) where T represents the DRX cycle of the UE, nB is indicated through system information, min(A, B) represents a smaller value among A and B, and max(A, B) represents a larger value among A and B, and the weights for paging carriers are determined based on the system information.

Preferably, the WUS resource includes a resource in at least one of a time domain, a frequency domain, or a code domain.

Preferably, the method may further includes, when detecting the WUS, receiving the paging signal in a paging occasion related to the WUS Preferably, the index information indicating the WUS resource hops over time.

Preferably, a hopping pattern for the index information indicating the WUS resource is determined based on a system frame number (SFN).

According to the present disclosure, a wake-up signal (WUS) may be transmitted and received efficiently.

Particularly according to the present disclosure, unnecessary paging monitoring operations of WUS-capable user equipments (UEs) may be reduced by efficiently transmitting and receiving a WUS based on UE sub-grouping for WUS transmission and reception.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION

In the following, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

Figure 1:
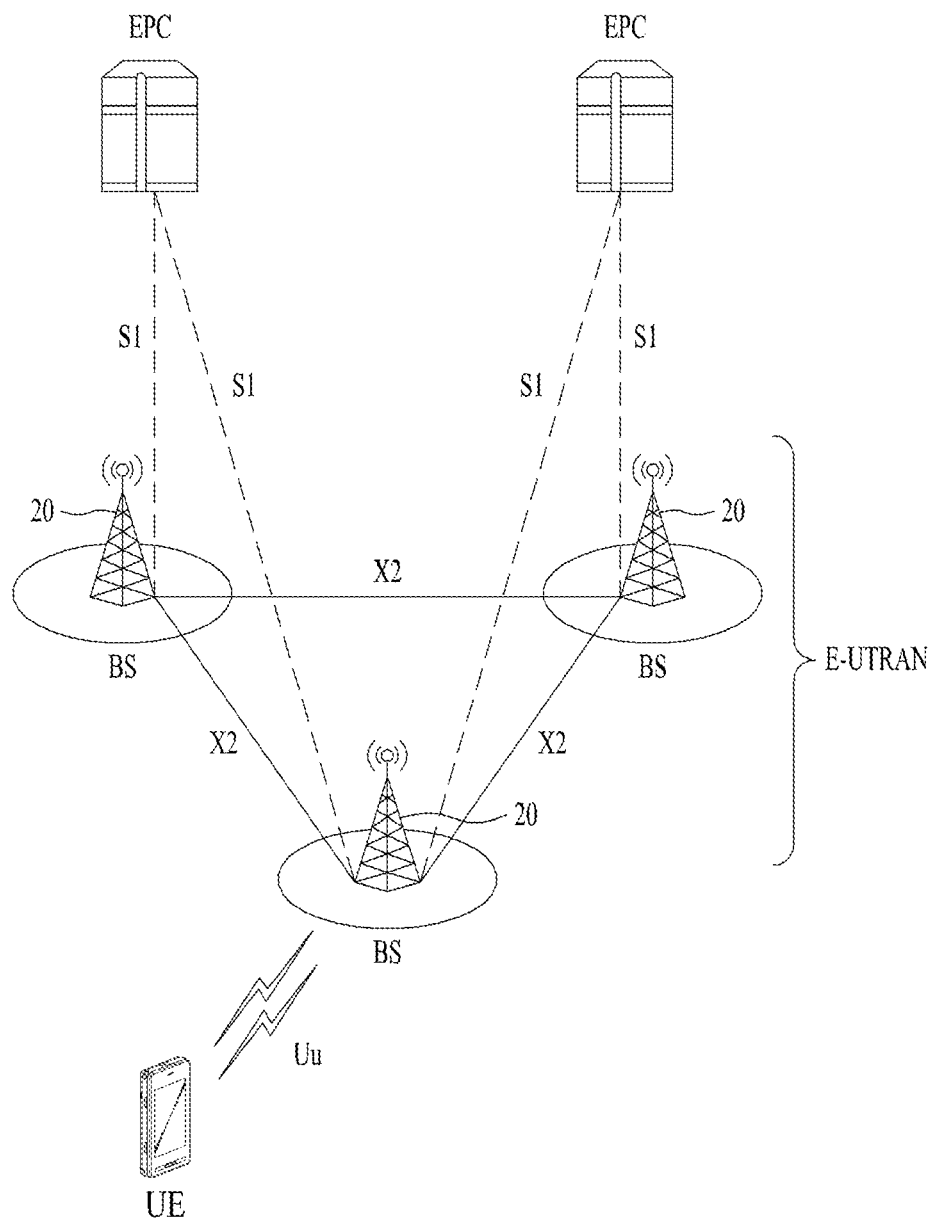
FIG. 1 illustrates an example of the 3GPP LTE system architecture.

3GPP LTE
36.211: Physical channels and modulation
36.212: Multiplexing and channel coding
36.213: Physical layer procedures
36.300: Overall description
36.304: User Equipment (UE) procedures in idle mode
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.304: User Equipment (UE) procedures in Idle mode and RRC Inactive state
36.331: Radio Resource Control (RRC) protocol specification A. System Architecture FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one BS 20 that provides control and user planes to a UE 10. The UE 10 may be fixed or mobile. The UE 10 may be referred to as another terminology such as 'mobile station (MS)', 'user terminal (UT)', 'subscriber station (SS)', 'mobile terminal (MT)', or 'wireless device'. In general, the BS 20 may be a fixed station that communicates with the UE 10. The BS 20 may be referred to as another terminology such as 'evolved Node-B (eNB)', 'general Node-B (gNB)', 'base transceiver system (BTS)', or 'access point (AP)'. The BSs 20 may be interconnected through an X2 interface. The BS 20 may be connected to an evolved packet core (EPC) through an S1 interface. More particularly, the BS 20 may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the BS and UE may exchange an RRC message through the RRC layer.

Figure 2:
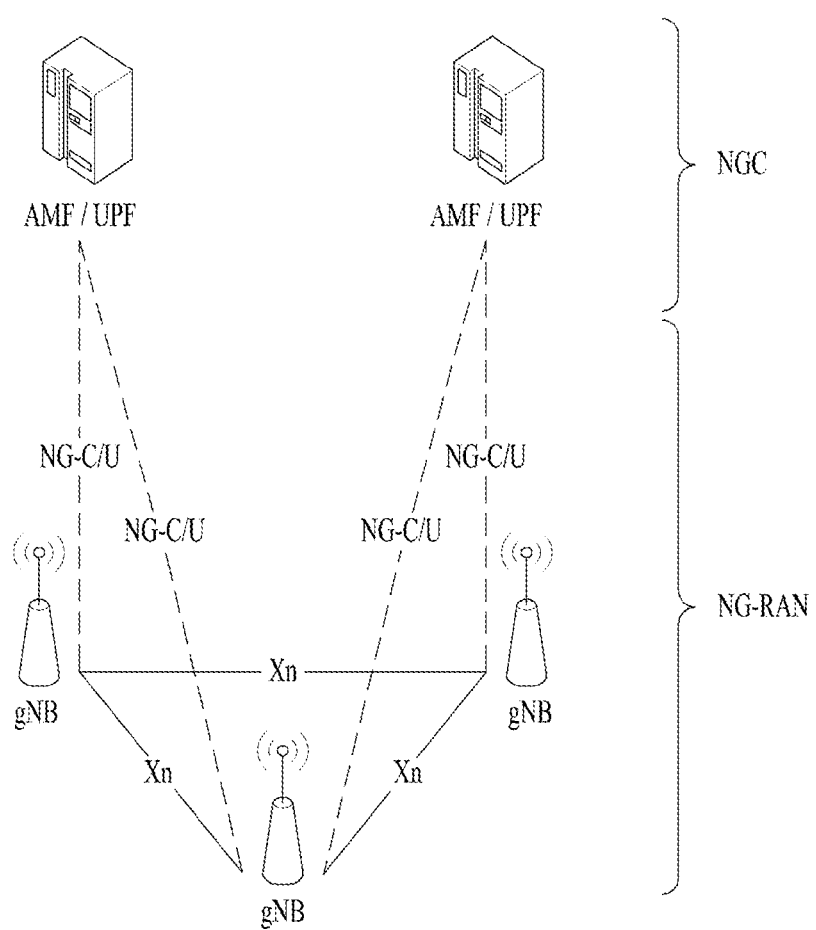
FIG. 2 illustrates an example of the 3GPP NR system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structure

Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms (Tf=307200×Ts=10 ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f=307200 \cdot T_s=10$ ms and is composed of 20 slots, each of which has a length of $T_{slot}=15360 \cdot T_s=0.5$ ms. The 20 slots are indexed from 0 to 19. A subframe is composed of two consecutive slots. That is, subframe i is composed of slot 2i and slot (2i+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

Figure 3:
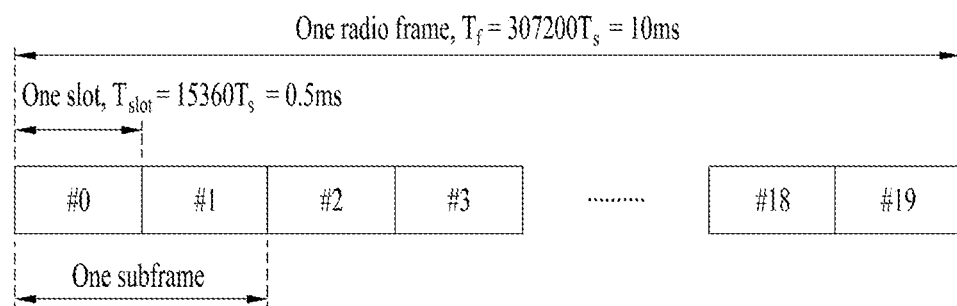
FIG. 3 illustrates a radio frame structure of frame structure type 1.

FIG. 3 illustrates a radio frame structure of frame structure type 1.

Referring to FIG. 3, the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f=307200 \times T_s=10$ ms and includes two half-frames, each of which has a length of $15360 \cdot T_s=0.5$ ms. Each half-frame includes five subframes, each of which has a length of $30720 \cdot T_s=1$ ms Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to 30720 $T_s=1$ ms Subframe i is composed of two slots, slot 2i and slot (2i+1), each of which has a length of $T_{slot}=15360 \cdot T_s=0.5$ ms.

Figure 4:
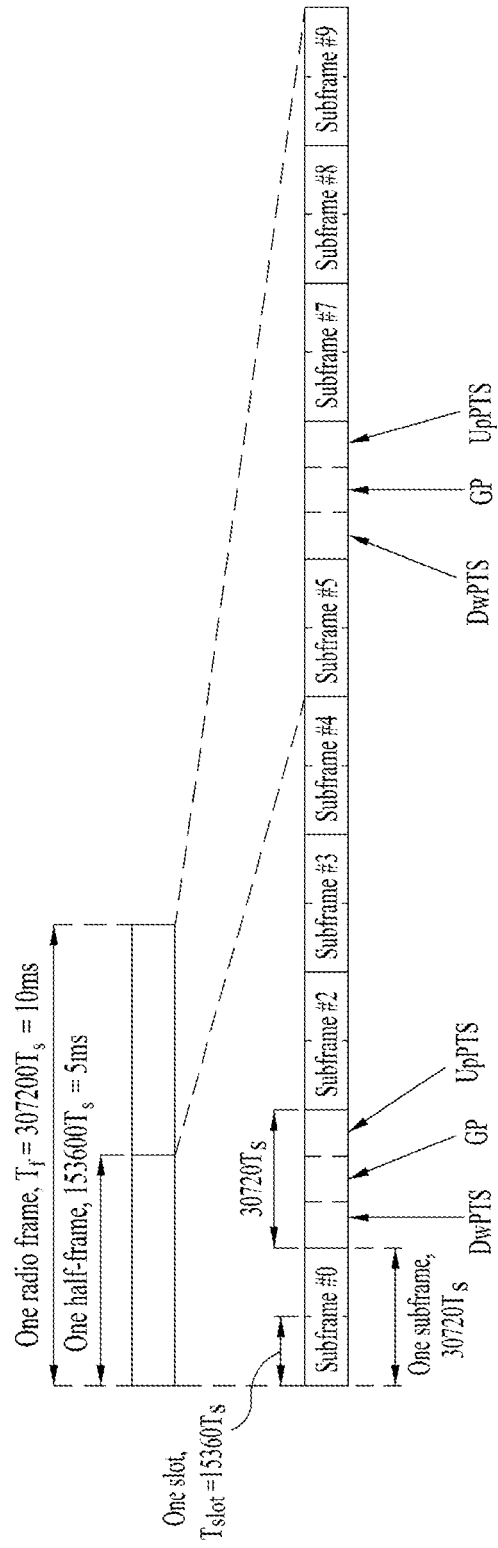
FIG. 4 illustrates a radio frame structure of frame structure type 2.

FIG. 4 illustrates a radio frame structure of frame structure type 2.

FIG. 4 shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 5:
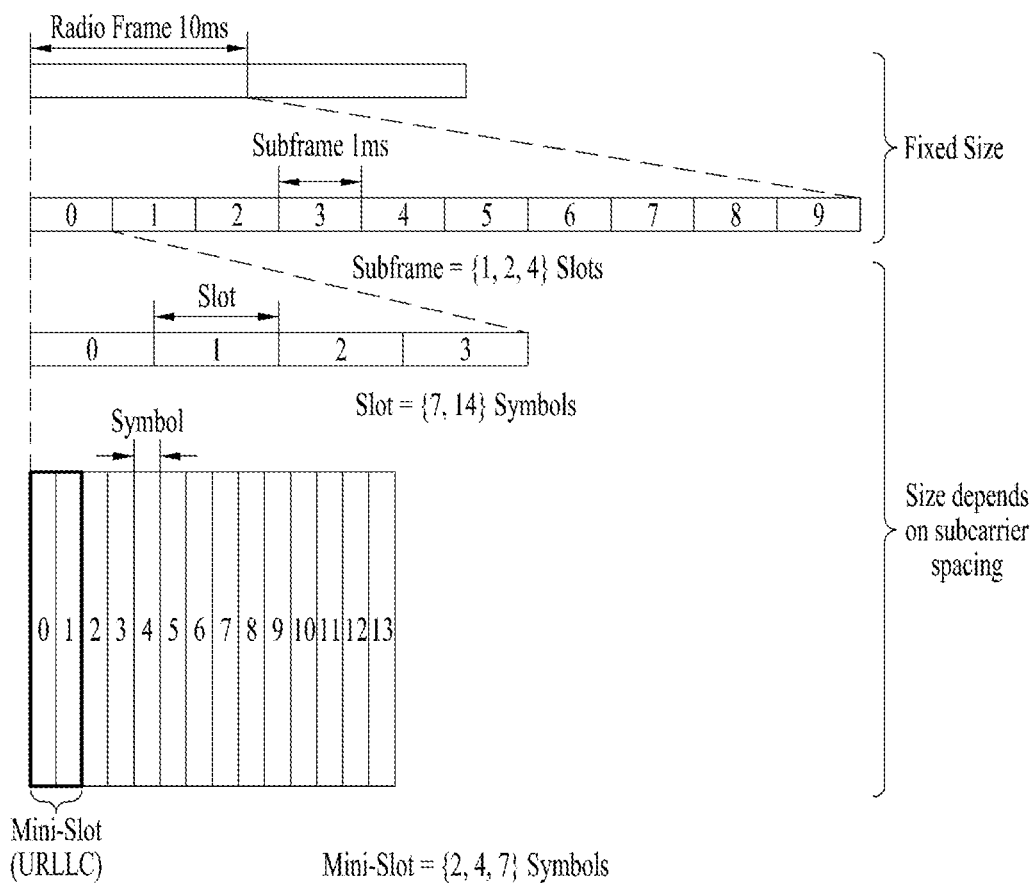
FIG. 5 illustrates an example of a frame structure in NR.

FIG. 5 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or μ). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s = 1/(\Delta f_{max} \cdot N_f)$. In this case $\Delta f_{max} = 480 \cdot 10^3$ and $N_f = 4096$. Downlink and uplink transmissions are configured in a radio frame having a duration of $T_r = (\Delta f_{max} N_f/100) \cdot T_s = 10$ ms. The radio frame is composed of 10 subframes, each having a duration of $T_{sf} = (\Delta f_{max} N_f/1000) \cdot T_s = 1$ ms. In this case, there may be a set of uplink frames and a set of downlink frames. Transmission of an uplink frame with frame number i from a UE needs to be performed earlier by $T_{TA} = N_{TA} T_s$ than the start of a corresponding downlink frame of the UE. Regarding the numerology μ, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$ One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$) the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 5 shows an example of μ=2, i.e., 60 kHz subcarrier spacing (SCS). Referring to Table 2, one subframe may include four slots. FIG. 5 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

C. Physical Resource

Figure 6:
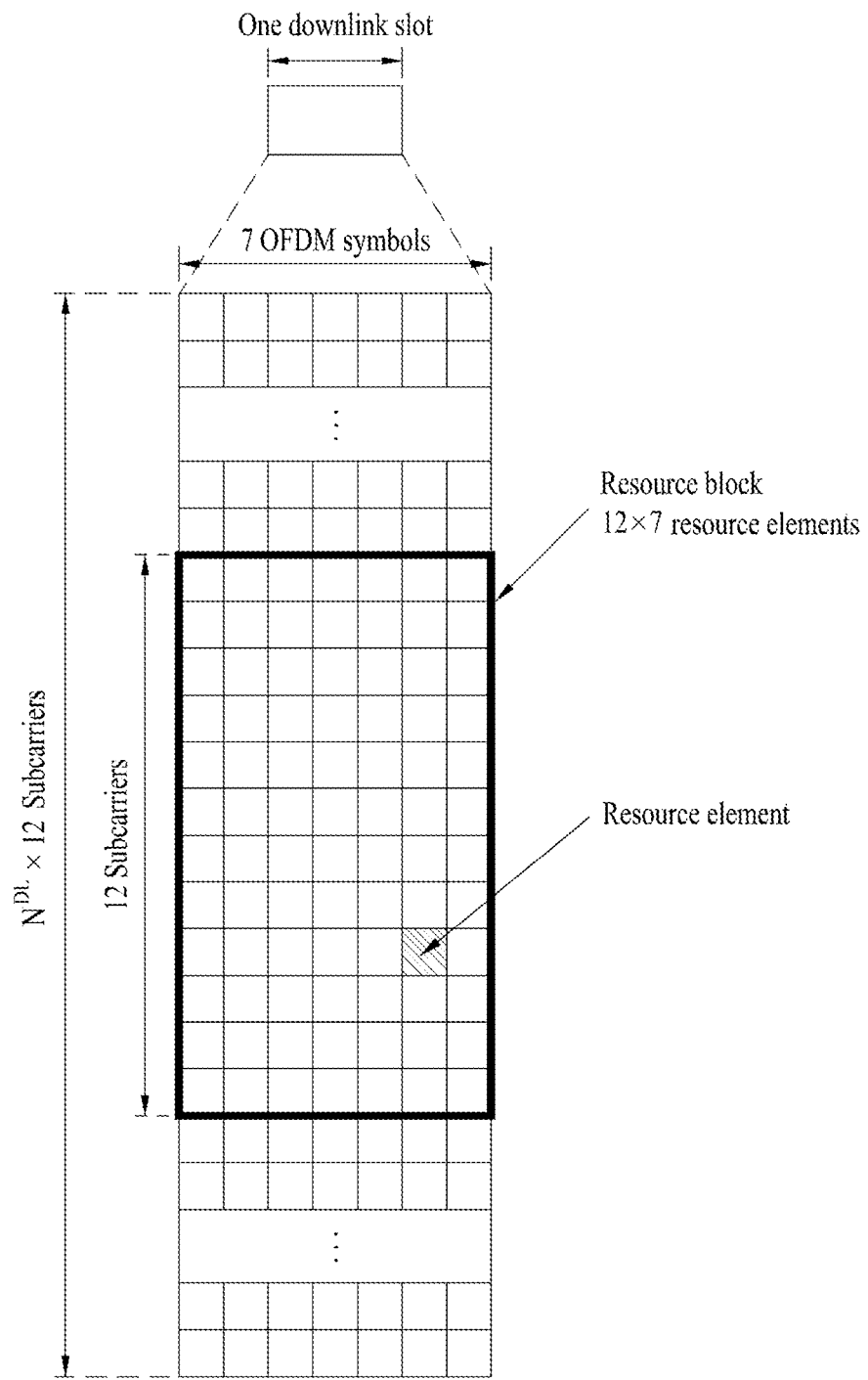
FIG. 6 illustrates a resource grid for one DL slot.

FIG. 6 illustrates a resource grid for one DL slot.

Referring to FIG. 6, a downlink slot includes a plurality of OFDM symbols in the time domain. One downlink slot includes 7 OFDM symbols in the time domain, and a resource block (RB) for example includes 12 subcarriers in the frequency domain. However, the present disclosure is not limited thereto. Each element of the resource grid is referred to as a resource element (RE). One RB includes 12×7 REs. The number of RBs in the DL slot depends on a downlink transmission bandwidth. An uplink slot may have the same structure as the downlink slot.

Figure 7:
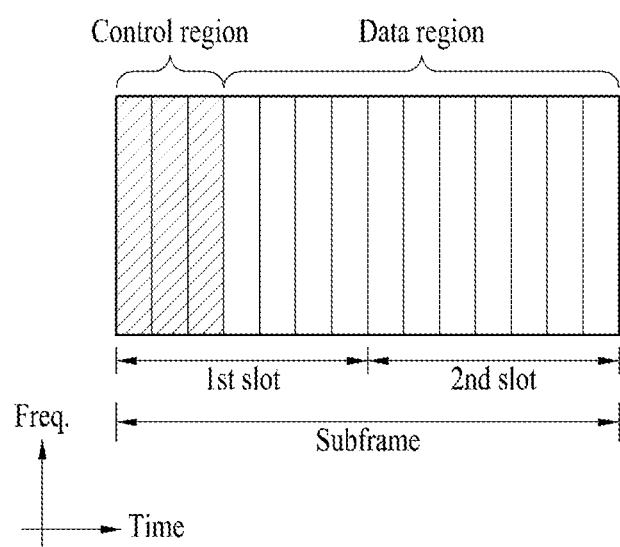
FIG. 7 illustrates the structure of a downlink subframe.

FIG. 7 illustrates the structure of a downlink subframe.

Referring to FIG. 7, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARD) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 8:
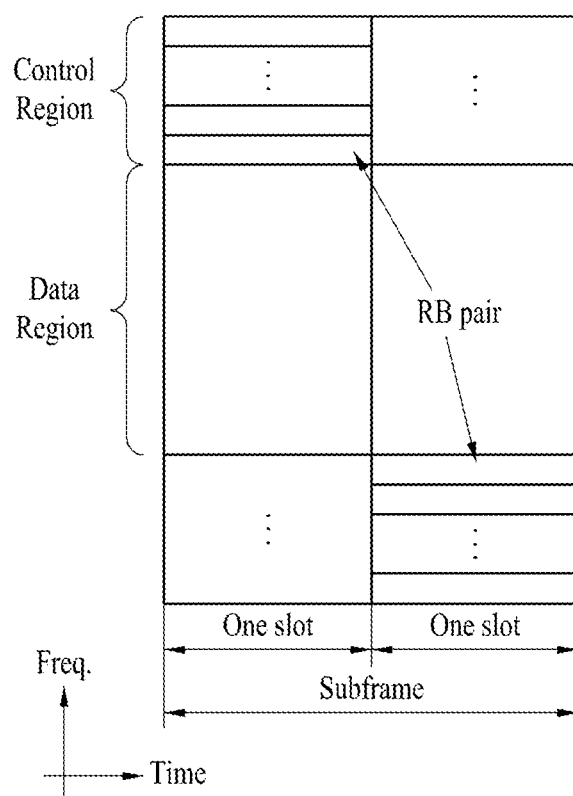
FIG. 8 illustrates the structure of an uplink subframe.

FIG. 8 illustrates the structure of an uplink subframe.

Referring to FIG. 8, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 9:
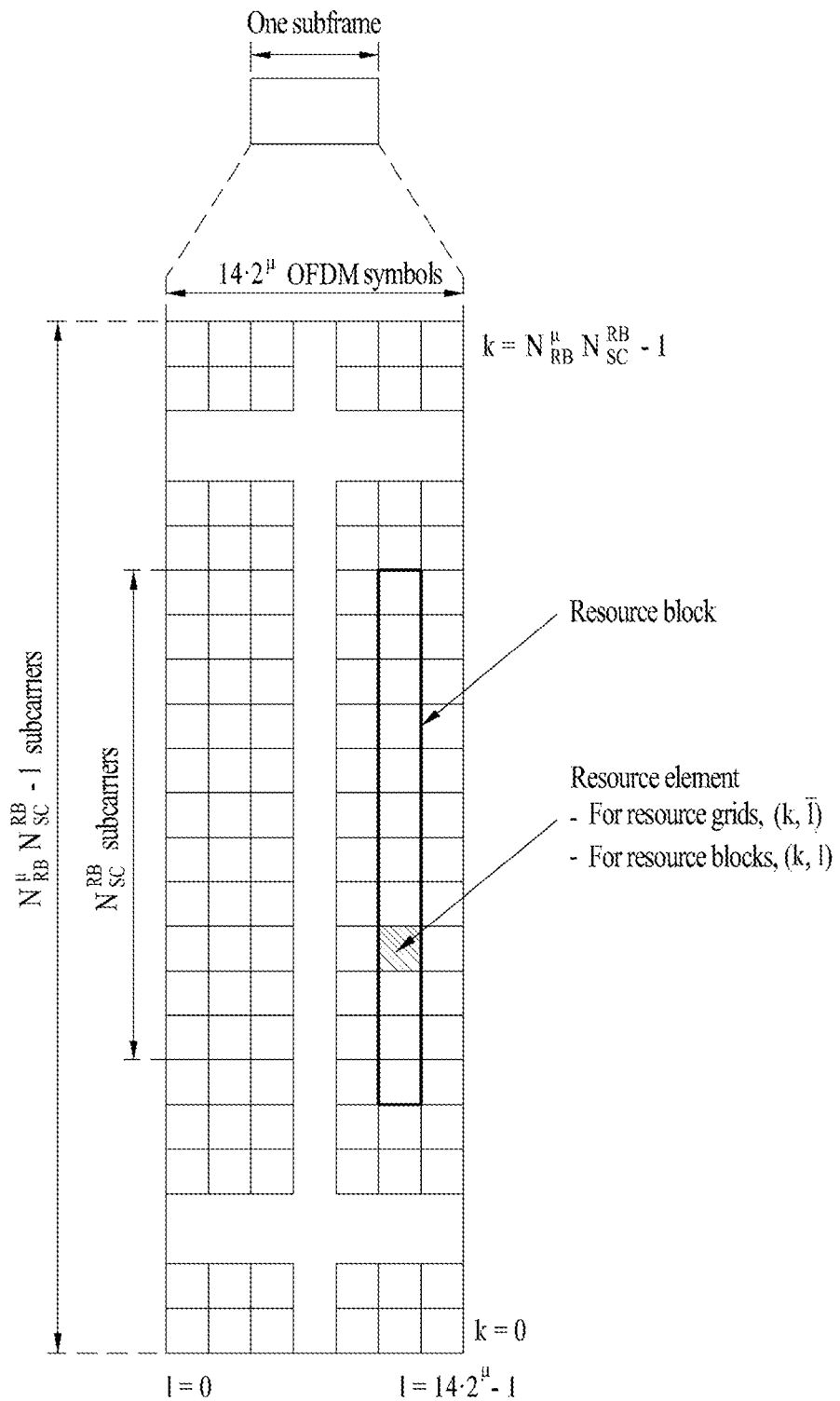
FIG. 9 illustrates an example of a resource grid in NR.

FIG. 9 illustrates an example of a resource grid in NR.

Referring to the resource grid of FIG. 9, there are $N_{RB}^{\mu} N_{sc}^{RB}$ subcarriers in the frequency domain, and there are $14 \cdot 2\mu$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \le N_{RB}^{max,\mu}$. $N_{RB}^{max,\mu}$ denotes the maximum transmission bandwidth and may change not only between numerologies but also between uplink and downlink. As shown in FIG. 9, one resource grid may be configured for each numerology $\mu$ and antenna port p. Each element of the resource grid for the numerology $\mu$ and antenna port p is referred to as a resource element, and it is uniquely identified by an index pair (k, l̄), where k is an index in the frequency domain (k=0, . . . , $N_{RB}^{\mu} N_{sc}^{RB}-1$) and l̄ denotes the location of a symbol in the subframe (l̄=, . . . , $2^{\mu} N_{symb}^{(\mu)}-1$). The resource element (k, l̄) for the numerology $\mu$ and antenna port p corresponds to a complex value $a_{k,\bar{l}}^{(p,\mu)}$. When there is no risk of confusion or when a specific antenna port or numerology is not specified, the indexes p and $\mu$ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration $\mu$.

The center of subcarrier 0 of common resource block 0 for the SCS configuration $\mu$ is equivalent to point A.

The relation between a common RB number $n_{CRB}^{\mu}$ in the frequency domain and a resource element (k,l) for the SCS configuration $\mu$ is determined as shown in Equation 1.

Equation 1

$$n_{CRB}^{\mu} = \left\lfloor \frac{k}{N_{sc}^{RB}} \right\rfloor$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 2.

Equation 2

$$n_{CRB} = n_{PRB} + N_{BWP,i}^{start}$$

In Equation 2, $N_{BWP,i}^{start}$ is a common resource block where the BWP starts relative to common resource block 0.

Figure 10:
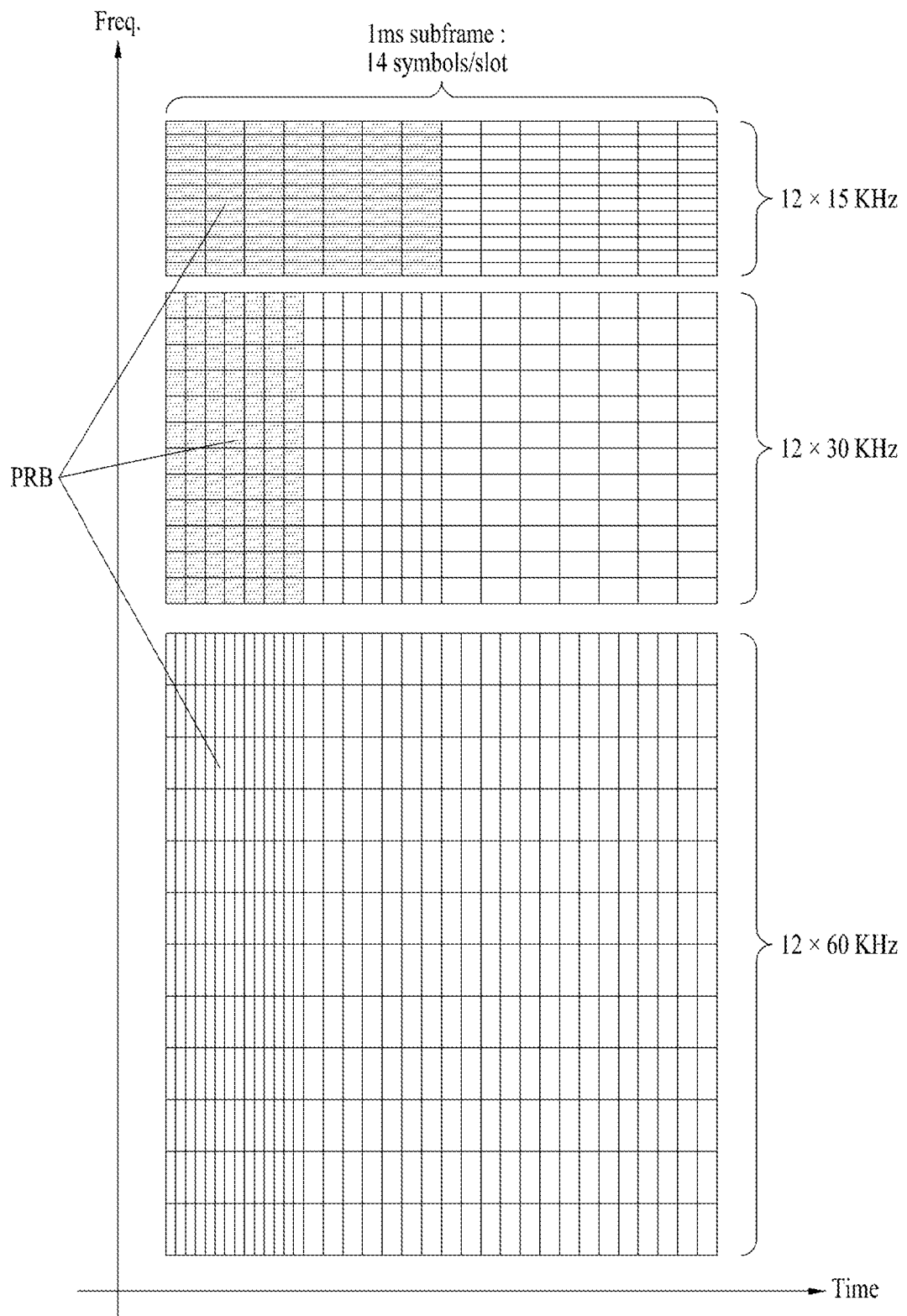
FIG. 10 illustrates an example of a physical resource block in NR.

FIG. 10 illustrates an example of a physical resource block in NR.

D. Wireless Communication Devices

Figure 11:
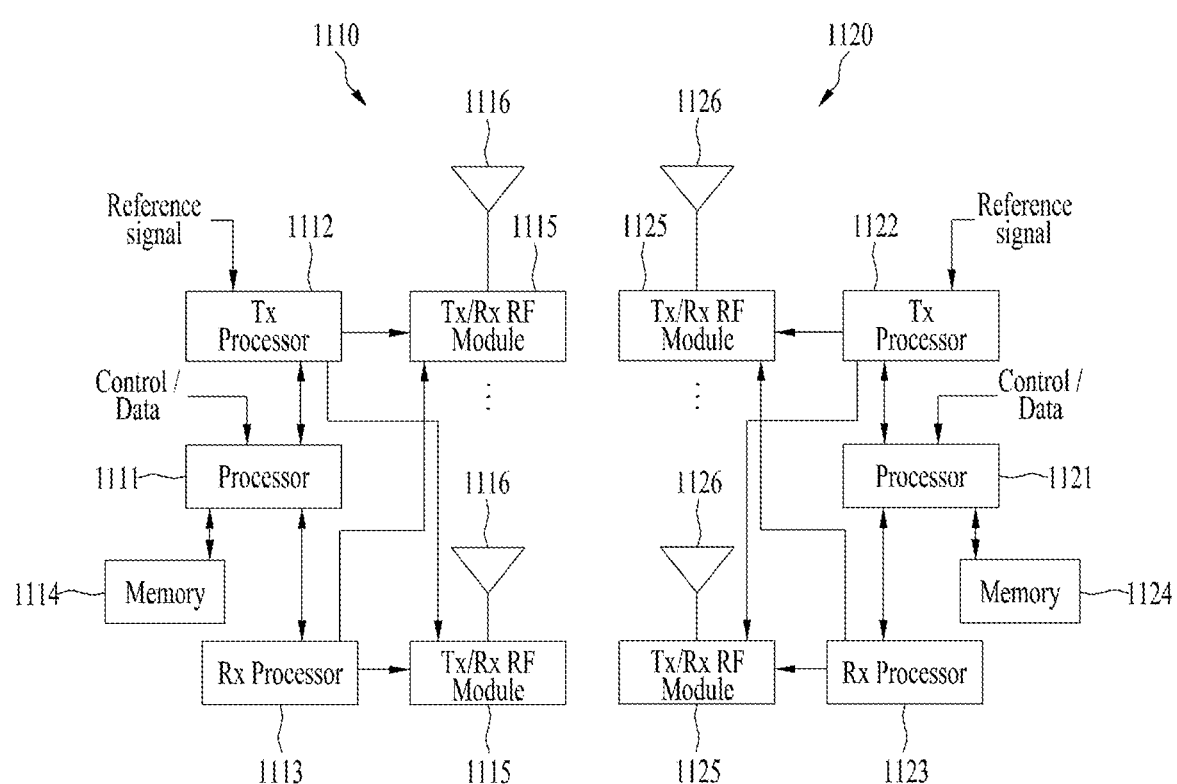
FIG. 11 illustrates a block diagram of a wireless communication apparatus to which the methods proposed in the present disclosure are applicable.

FIG. 11 illustrates a block diagram of a wireless communication apparatus to which the methods proposed in the present disclosure are applicable.

Referring to FIG. 11, a wireless communication system includes a base station 1110 and multiple UEs 1120 located within coverage of the base station 1110. The base station 1110 and the UE may be referred to as a transmitter and a receiver, respectively, and vice versa. The base station 1110 includes a processor 1111, a memory 1114, at least one transmission/reception (Tx/Rx) radio frequency (RF) module (or RF transceiver) 1115, a Tx processor 1112, an Rx processor 1113, and an antenna 1116. The UE 1120 includes a processor 1121, a memory 1124, at least one Tx/Rx RF module (or RF transceiver) 1125, a Tx processor 1122, an Rx processor 1123, and an antenna 1126. The processors are configured to implement the above-described functions, processes and/or methods. Specifically, the processor 1111 provides a higher layer packet from a core network for downlink (DL) transmission (communication from the base station to the UE). The processor implements the functionality of layer 2 (L2). In downlink (DL), the processor provides the UE 1120 with multiplexing between logical and transmission channels and radio resource allocation. That is, the processor is in charge of signaling to the UE. The Tx processor 1112 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with a reference signal (RS) in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 1116 through the Tx/Rx module (or transceiver) 1115. Each Tx/Rx module may modulate an RF carrier with each spatial stream for transmission. At the UE, each Tx/Rx module (or transceiver) 1125 receives a signal through each antenna 1126 thereof. Each Tx/Rx module recovers information modulated on the RF carrier and provides the information to the RX processor 1123. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the base station. Such soft decisions may be based on channel estimation values. The soft decisions are decoded and deinterleaved to recover data and control signals originally transmitted by the base stationover the physical channel. The corresponding data and control signals are provided to the processor 1121.

Uplink (UL) transmission (communication from the UE to the base station) is processed by the base station 1110 in a similar way to that described in regard to the receiver functions of the UE 1120. Each Tx/Rx module (or transceiver) 1125 receives a signal through each antenna 1126. Each Tx/Rx module provides an RF carrier and information to the Rx processor 1123. The processor 1121 may be connected to the memory 1124 storing program codes and data. The memory may be referred to as a computer-readable medium.

E. Machine Type Communication (MTC)

The Machine Type Communication (MTC) refers to communication technology adopted by 3$^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as 'eMTC', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding the smallest system bandwidth in Tables 6 and 7 as in the legacy LTE. Alternatively, the MTC may operate in at least one BWP or in a specific band of a BWP.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} \geq 4$, $N_{WB}^{UL}=1$ and a single wideband is composed of $N_{NB}^{UL}$ non-overlapping narrowband(s).

For example, in the case of a 10 MHz channel, 8 non-overlapping narrowbands are defined.

Figure 12A:
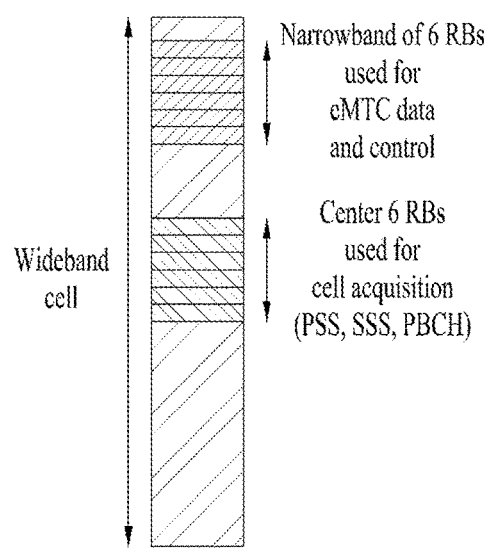
FIGS. 12A and 12B illustrate examples of narrowband operations and frequency diversity.
Figure 12B:
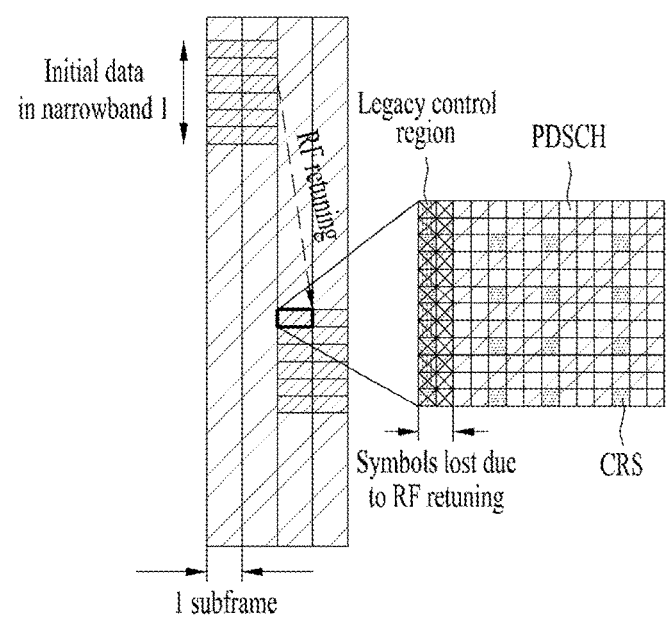

FIGS. 12A and 12B illustrate examples of narrowband operations and frequency diversity.

Specifically, FIG. 12A illustrates an example of the narrowband operation, and FIG. 12B illustrates an example of repetitions with RF retuning.

Hereinafter, frequency diversity by RF retuning will be described with reference to FIG. 12B.

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is returned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
|---|---|---|
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 13:
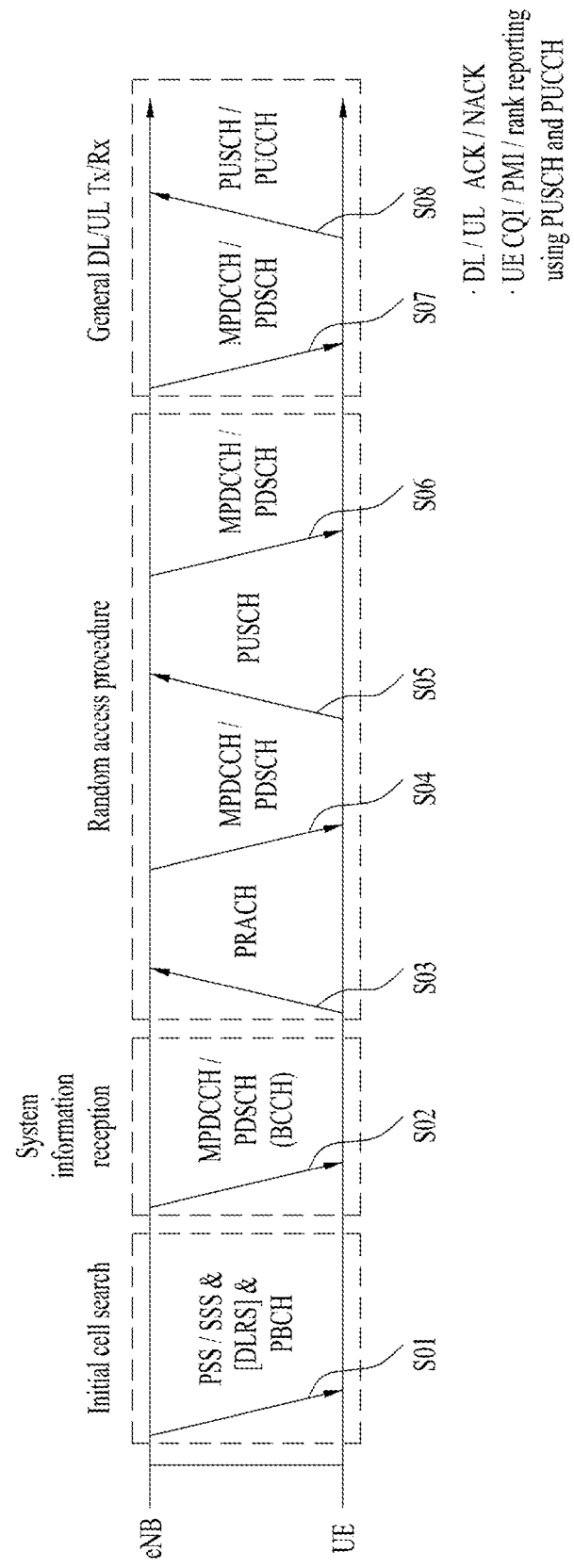
FIG. 13 illustrates physical channels available in MTC and a general signal transmission method using the same.

FIG. 13 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 14:
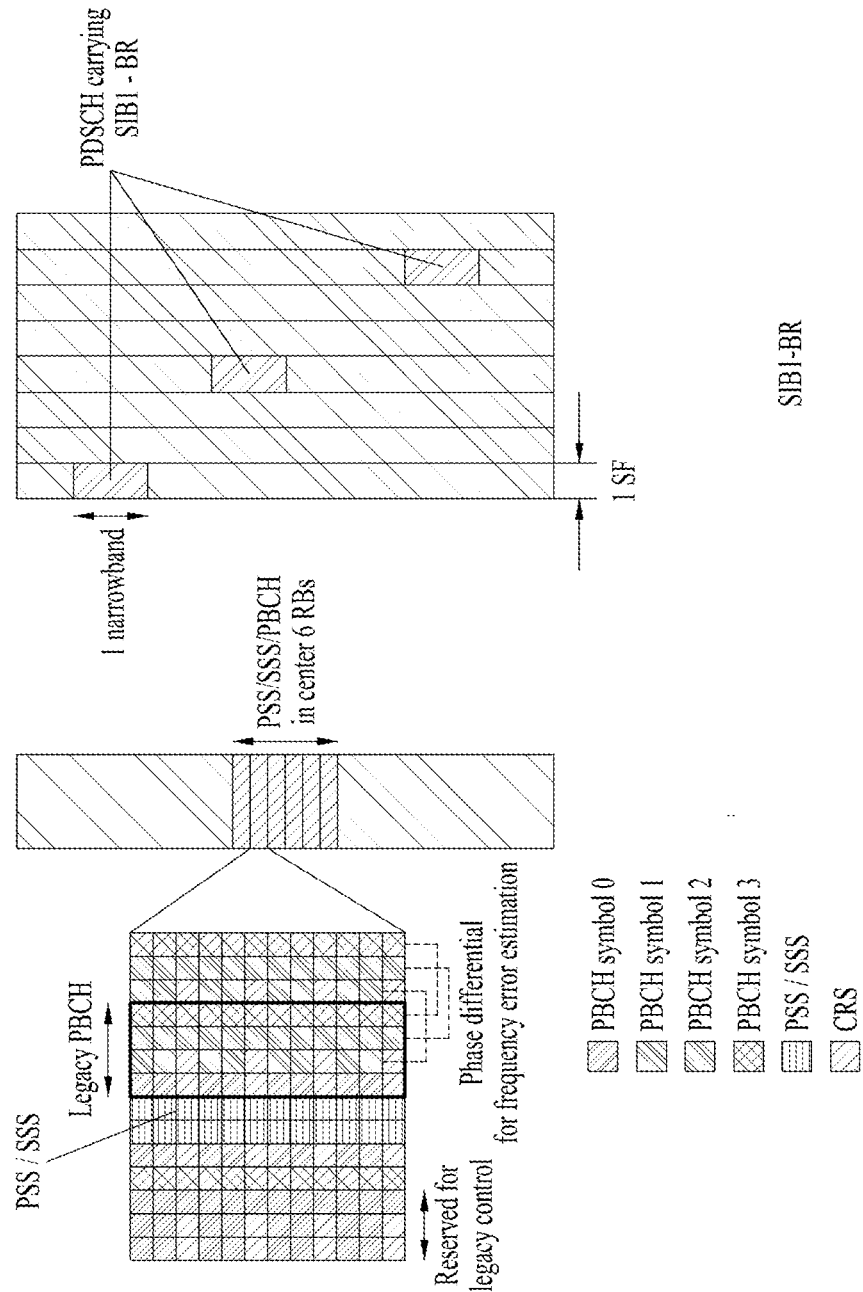
FIGS. 14A and 14B illustrate an example of system information transmissions in MTC.

FIGS. 14A and 14B illustrate an example of system information transmissions in MTC.

Specifically, FIG. 14A illustrates an example of a repetition pattern for subframe #0 in FDD and a frequency error estimation method for a normal CP and repeated symbols, and FIG. 14B illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

```
-- ASN1START
MasterInformationBlock ::=    SEQUENCE {
        dl-Bandwidth                  ENUMERATED {
                                        n6, n15, n25, n50, n75, n100},
        phich-Config                  PHICH-Config,
        systemFrameNumber             BIT STRING (SIZE (8)),
        schedulingInfoSIB1-BR-r13     INTEGER (0..31),
        systemInfoUnchanged-BR-r15    BOOLEAN,
        spare                         BIT STRING (SIZE (4))
}
-- ASN1STOP
```

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple NIPDCCHs are supported and a set of NIPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 15:
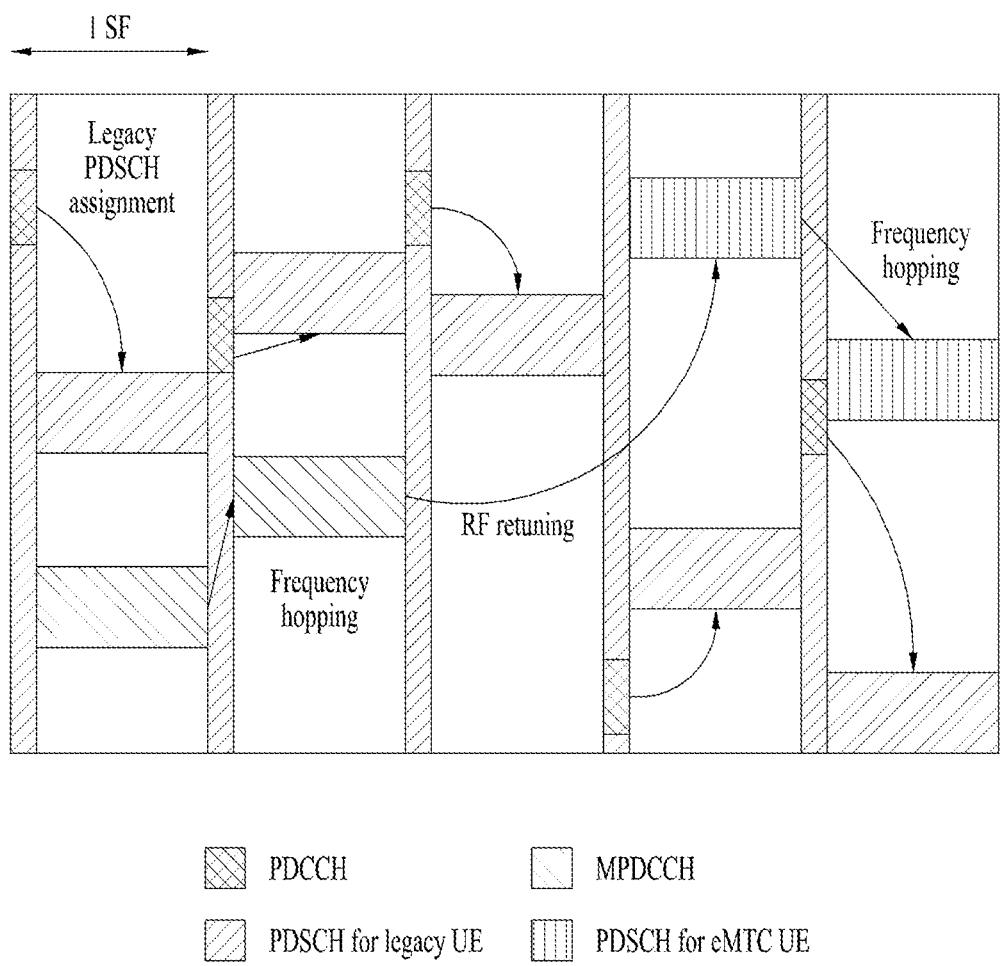
FIG. 15 illustrates an example of scheduling for each of MTC and legacy LTE.

FIG. 15 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH F. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 16:
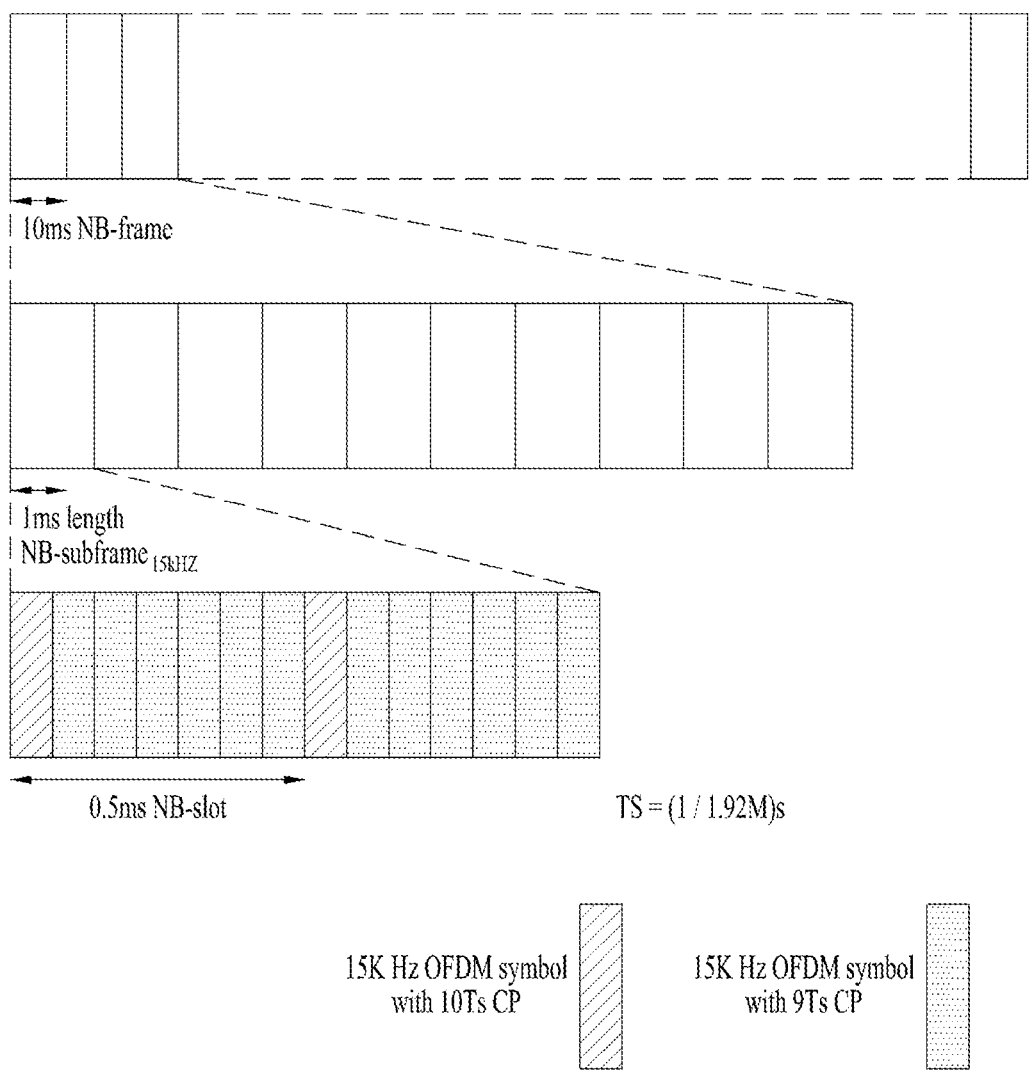
FIGS. 16 and 17 illustrate examples of NB-IoT frame structures according to subcarrier spacing.
Figure 17:
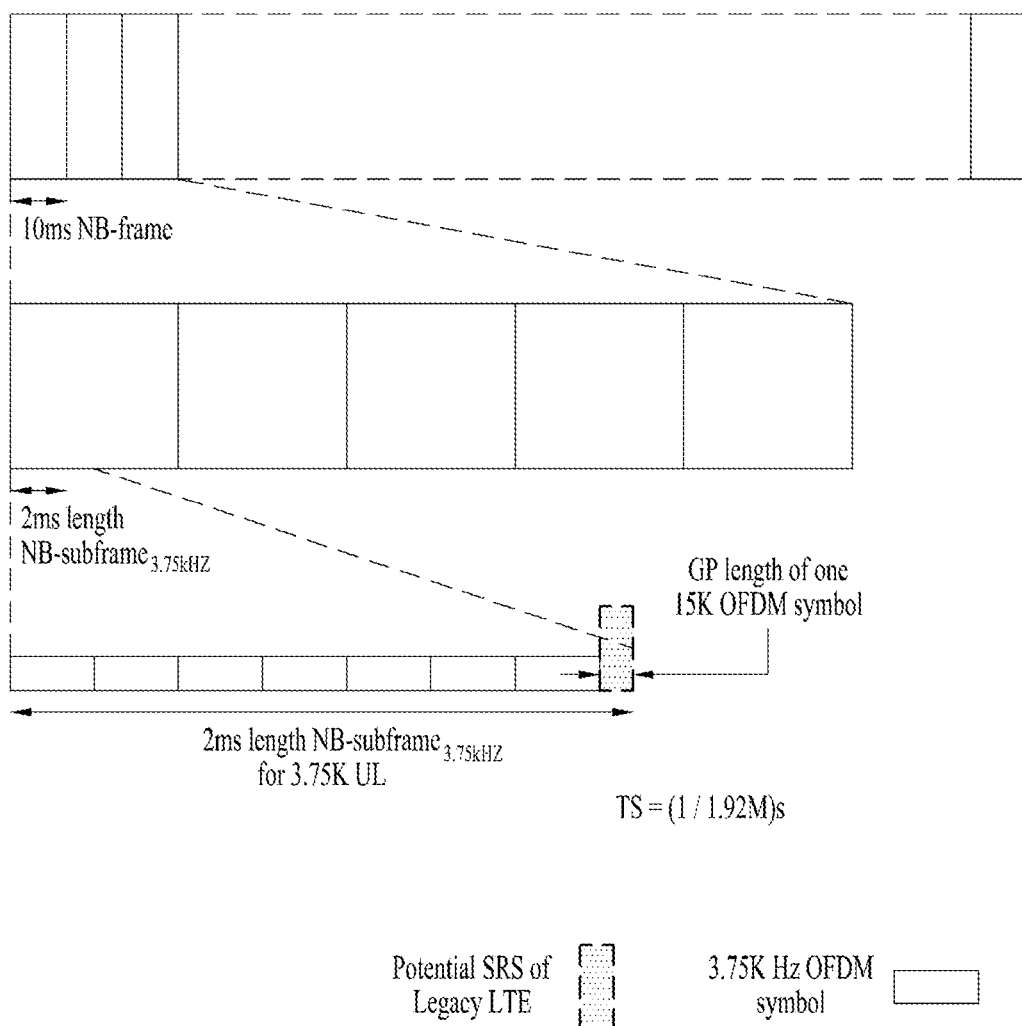

FIGS. 16 and 17 illustrate examples of NB-IoT frame structures according to subcarrier spacing (SCS). Specifically, FIG. 16 illustrates a frame structure with SCS of 15 kHz, and FIG. 17 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 16, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 17, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 18:
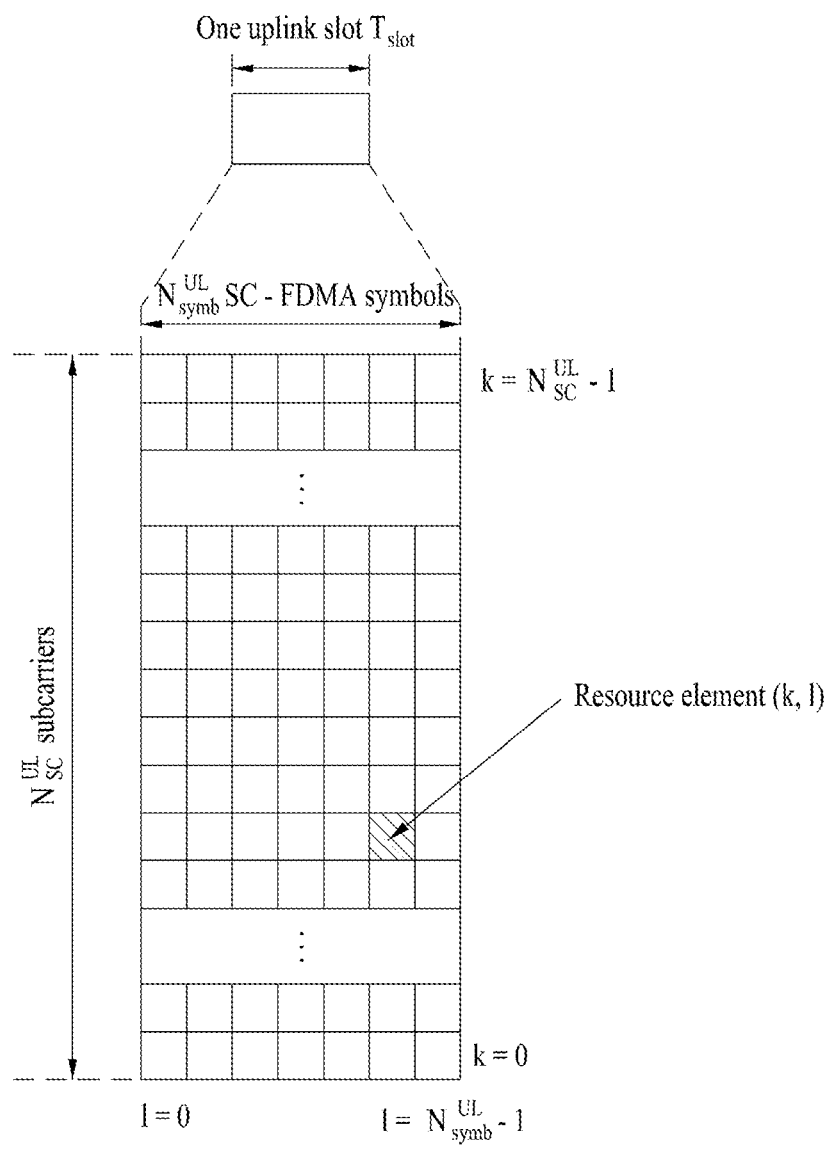
FIG. 18 illustrates an example of the resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 18. The number of subcarriers $N_{sc}^{UL}$ and the slot period $T_{slot}$ may be given in Table 10 below.

FIG. 18 illustrates an example of the resource grid for NB-IoT uplink.

TABLE 10

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A resource unit (RU) for the NB-IoT uplink may include SC-FDMA symbols in the time domain and $N_{symb}^{UL}N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 | 7 |
|   | 15 kHz | 1 | 4 |   |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format NO, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 19A:
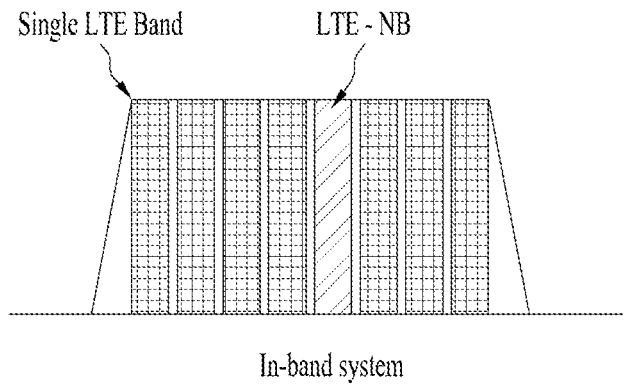
FIGS. 19A to 19C illustrate an examples of operation modes supported in the NB-IoT system.
Figure 19B:
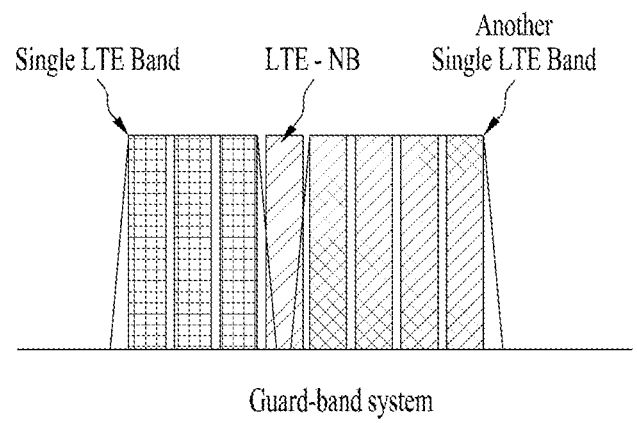
Figure 19C:
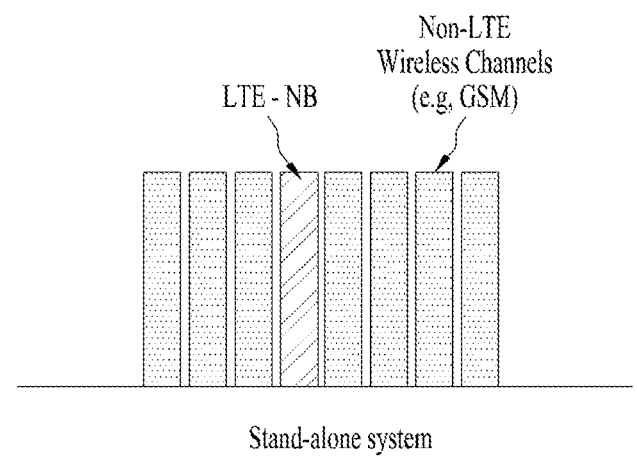

The operation mode of the NB-IoT will be described. The NB-IoT system may support three operation modes. FIGS. 19A to 19C illustrate an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 19A illustrates an in-band system, FIG. 19B illustrates a guard-band system, and FIG. 19C illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

Figure 20:
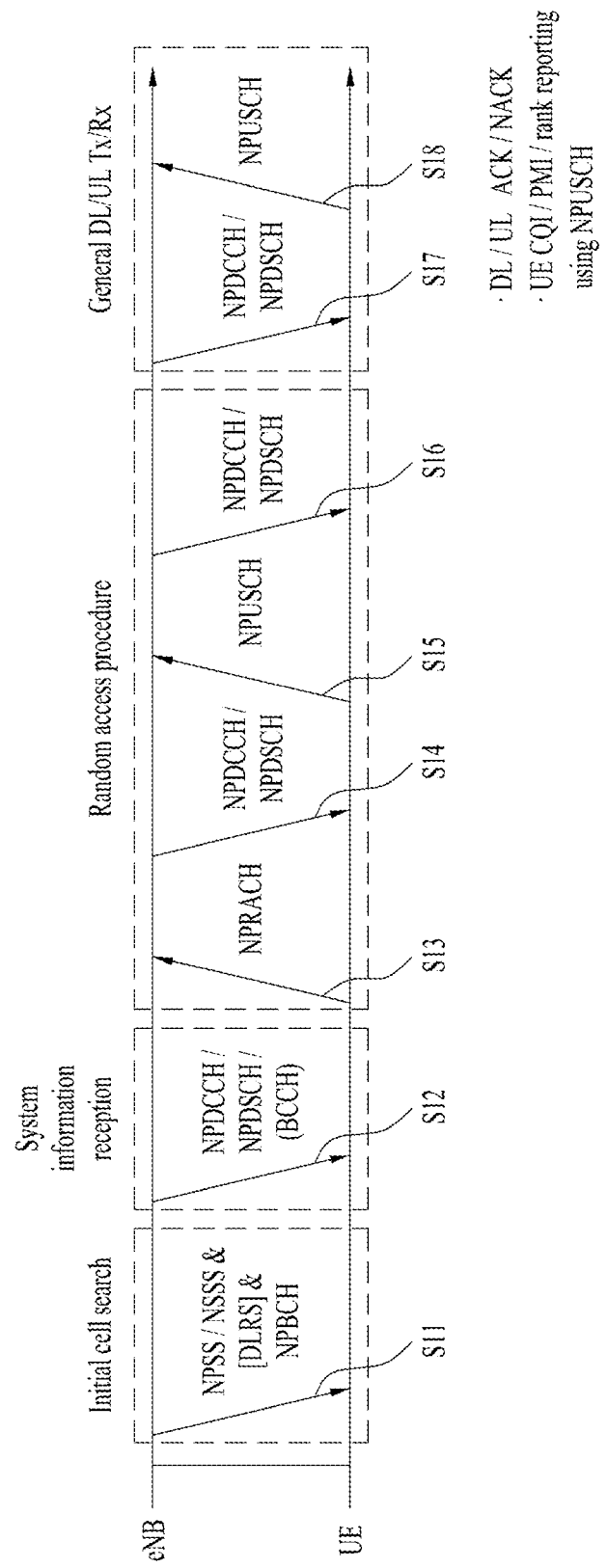
FIG. 20 illustrates an example of physical channels available in the NB-IoT and a general signal transmission method using the same.

FIG. 20 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

6) Initial Access Procedure in NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 21:
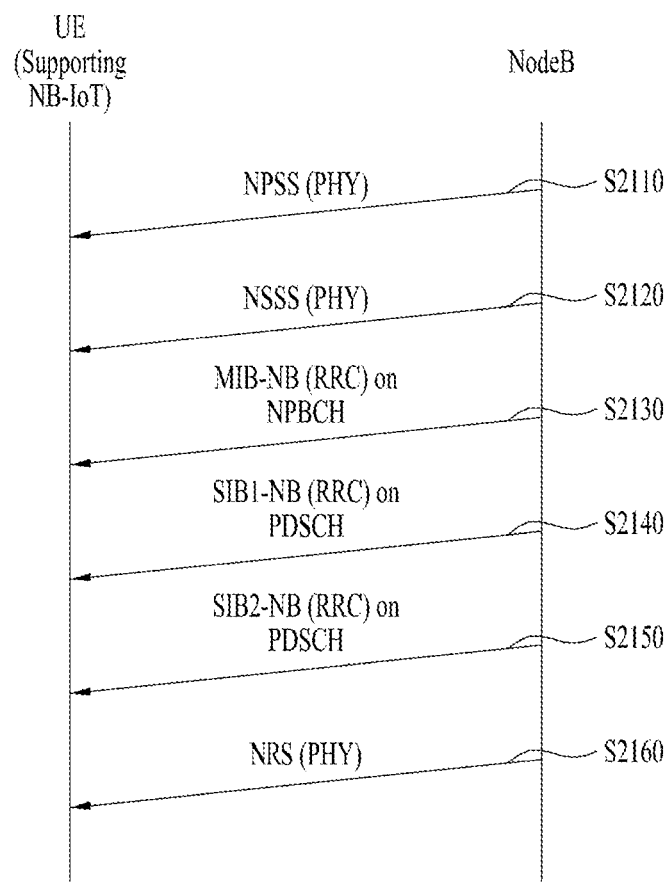
FIG. 21 illustrates an example of the initial access procedure in the NB-IoT.

FIG. 21 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 21.

FIG. 21 illustrates an example of the initial access procedure in the NB-IoT. The name of each physical channel and/or signal may vary depending on the wireless communication system to which the NB-IoT is applied. For example, although the NB-IoT based on the LTE system is considered in FIG. 21, this is merely for convenience of description and details thereof are applicable to the NB-IoT based on the NR system. The details of the initial access procedure are also applicable to the MTC.

Referring to FIG. 21, the NB-IoT UE may receive a narrowband synchronization signal (e.g., NPSS, NSSS, etc.) from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

7) Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 22:
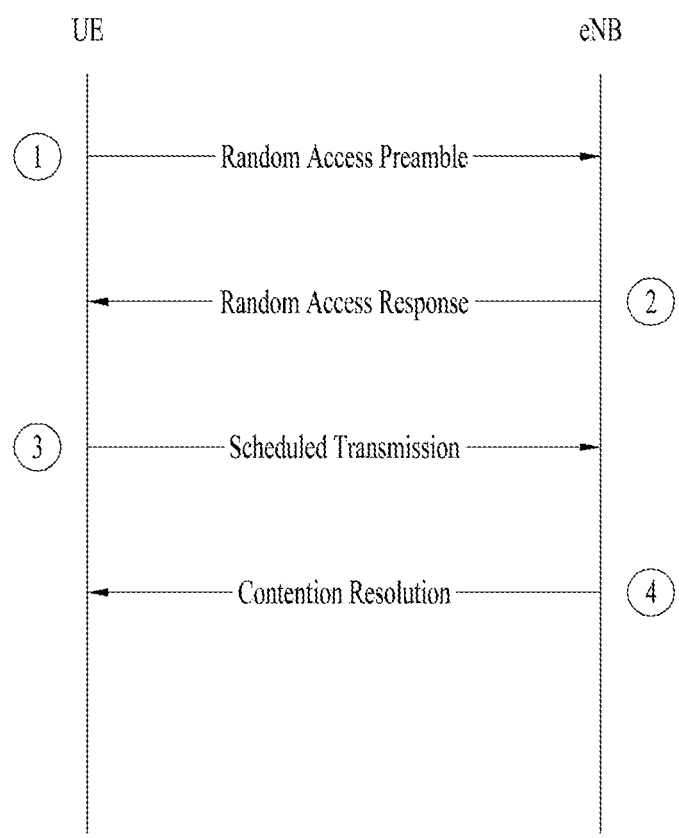
FIG. 22 illustrates an example of the random access procedure in the NB-IoT.

FIG. 22 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 22 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 22, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

8) DRX Procedure in NB-IoT

While performing the general signal transmission and reception procedure of the NB-IoT, the NB-IoT UE may transit to an idle state (e.g., RRC IDLE state) and/or an inactive state (e.g., RRC INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI.

Figure 23:
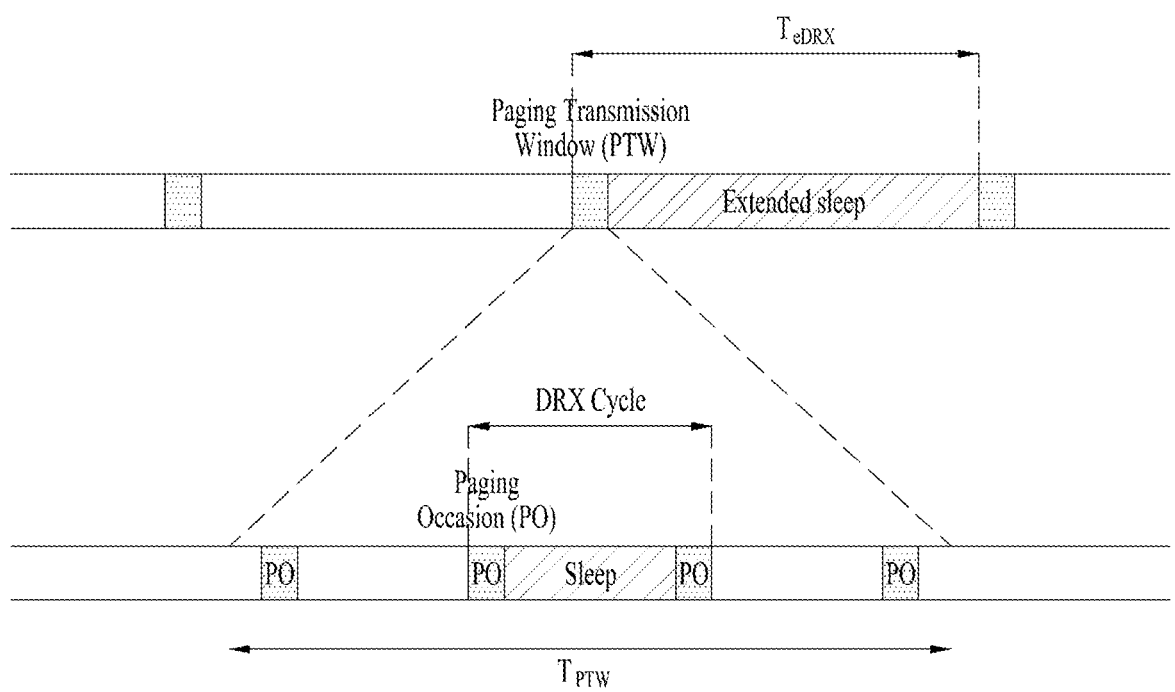
FIG. 23 illustrates an example of DRX mode in an idle state and/or an inactive state.

FIG. 23 illustrates an example of DRX mode in an idle state and/or an inactive state.

Figure 24:
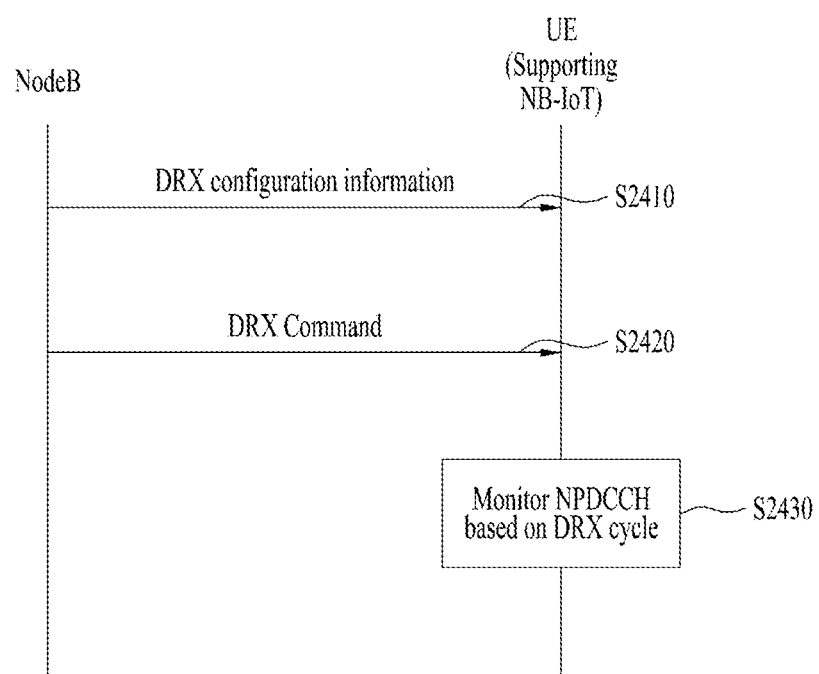
FIG. 24 illustrates an example of a DRX configuration and indication procedure for the NB-IoT UE.

A DRX configuration and indication for the NB-IoT UE may be provided as shown in FIG. 24. That is, FIG. 24 illustrates an example of a DRX configuration and indication procedure for the NB-IoT UE. However, the procedure in FIG. 24 is merely exemplary, and the methods proposed in the present disclosure are not limited thereto.

Referring to FIG. 24, the NB-IoT UE may receive DRX configuration information from the base station (e.g., NodeB, eNodeB, eNB, gNB, etc.) (S2410). In this case, the UE may receive the information from the base station through higher layer signaling (e.g., RRC signaling). The DRX configuration information may include DRX cycle information, a DRX offset, configuration information for DRX-related timers, etc.

Thereafter, the NB-IoT UE may receive a DRX command from the base station (S2420). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2430). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 24, the NB-IoT UE may initialize (or reconfigure) the connection (e.g., RRC connection) with the base station (for example, the UE may perform the cell search procedure of FIG. 20). Alternatively, the NB-IoT UE may receive (or obtain) new system information from the base station (for example, the UE may perform the system information acquisition procedure of FIG. 20).

G. Proposal for Sub-Grouping WUS-Capable UEs

In an LTE system, a user equipment (UE) may determine a position at which the UE will monitor paging based on a paging occasion (PO) and paging frame (PF) determined based on its UE_ID. The same technical idea is applied to NB-IoT and MTC which have been newly introduced to the 3GPP LTE Rel-13 standard. A plurality of UEs may expect paging in one PO, and the number of the UEs may be determined according to a configuration in an SIB transmitted by a base station (B S). Hereinafter, a group of a plurality of UEs which may expect paging in the same PO will be defined as a UE-group-per-PO.

A method of using a wake-up signal (WUS) for power saving of a UE has been introduced to the Rel-15 NB-IoT and MTC standard. In this method, a UE capable of using the WUS, that is, a WUS-capable UE attempts to detect the WUS based on information configured by a BS before monitoring a search space for paging. When the UE detects the WUS, the UE may expect transmission of paging in POs related to the position of detecting the WUS and monitor the search space for paging. When the UE fails to detect the WUS, the UE may not monitor (or skip monitoring) the search space for paging. The Rel-15 standard defines that a WUS transmission position is determined to be a position relative to a PO indicated by the WUS, and all WUS-capable UEs monitoring the same PO share the same WUS and the same WUS transmission position. Accordingly, when a WUS transmitted for a specific PO is present, all WUS-capable UEs in a UE-group-per-PO corresponding to the PO should perform paging monitoring.

Figure 25:
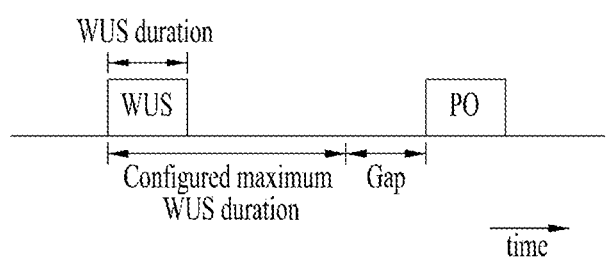
FIG. 25 illustrates an exemplary timing relationship between a WUS and a PO.

FIG. 25 illustrates an exemplary timing relationship between a WUS and a PO.

A UE may receive WUS configuration information from a BS and monitor a WUS based on the WUS configuration information. More specifically, the UE receives the configuration information related to the WUS from the BS by higher-layer signaling. The UE monitors/receives the WUS from the BS during a configured maximum WUS duration.

The WUS configuration information may include, for example, information about the maximum WUS duration, the number of consecutive POs related to the WUS, and a gap. The maximum WUS duration is a maximum time period during which the WUS is transmittable, which may be expressed as a ratio of a maximum repetition number (e.g., Rmax) related to a PDCCH. The WUS may be transmitted repeatedly one or more times during the maximum WUS duration. The number of POs related to the WUS is the number of POs in which the UE will not monitor a channel related to paging, when the UE fails to detect the WUS (or the number of POs in which the UE will monitor the channel related to paging, when the UE detects the WUS). The gap information indicates a time gap between the end of the maximum WUS duration and the first PO related to the WUS.

A WUS duration may be short for a UE in good coverage and long for a UE in bad coverage. Upon detection of the WUS, a UE does not monitor the WUS until the first PO related to the WUS. The UE does not monitor the WUS either during a gap duration. Therefore, when the UE fails to detect the WUS during the maximum WUS duration, the UE does not monitor the channel related to paging in the POs related to the WUS (or the UE remains in sleep mode).

Paging may be transmitted only to a part of the UEs of the same UE-group-per-PO according to determination of a mobility management entity (MME) or a BS (eNB or gNB). Because according to the current standard, information indicating UEs to which a WUS and paging are directed among the UEs of a UE-group-per-PO is delivered on an NPDSCH carrying paging traffic, some UEs may perform unnecessary NPDCCH/NPDSCH decoding.

Particularly, for an NB-IoT UE and an MTC UE, a PDCCH (MPDCCH or NPDCCH) and PDSCH (or NPDSCH) for paging reception may be repeatedly transmitted and received tens of times to a few thousand times, for coverage enhancement. When paging is directed only to a part of the UEs of a UE-group-per-PO, UEs to which the paging is not directed may identify the absence of paging for the UEs only after decoding both of a PDCCH (MPDCCH or NPDCCH) and a related PDSCH (or NPDSCH) as well as after detecting the WUS. Accordingly, the UEs may suffer from much unnecessary power consumption due to the unnecessary operation of receiving the WUS, the PDCCH (MPDCCH or NPDCCH), and the related PDSCH (or NPDSCH).

In light of the above problem, the present disclosure proposes criteria for applying a WUS based on UE sub-grouping and methods of configuring the UE sub-grouping, in order to reduce unnecessary paging monitoring of WUS-capable UEs. Each UE sub-group configured in the proposed methods of the present disclosure may be configured independently with a WUS distinguished by a time-domain resource, frequency-domain resource, and/or code-domain resource. In the following description, a specific time-domain resource, frequency-domain resource, and/or code-domain resource configurable for a specific UE sub-group to transmit and receive a WUS is referred to as a WUS resource.

While the proposed methods of the present disclosure are described below in the context of NB-IoT and MTC, it is apparent that the same technical idea is generally applicable to any communication system. Further, while the proposed methods of the present disclosure are described in the context of a WUS indicating whether paging will be transmitted in IDLE mode, it is apparent that the same technical idea is generally applicable to any signal (or channel) used to indicate additional information about a channel (or signal) serving any purpose (e.g., information indicating whether the channel (or signal) is to be transmitted).

Further, while the present disclosure is described based on an LTE standard (e.g., 3GPP technical specification 36 series), the present disclosure may be applied in the same/similar manner to a 5G/NR system. In this case, in relation to a frame structure, the term "subframe" may be replaced with "slot" (e.g., refer to FIGS. 5 and 9 and a related description) in the 5G/NR system.

Although the proposed methods of the present disclosure may be performed independently of each other, it is apparent that they may be performed in combination, unless conflicting with each other.

In the present disclosure, a WUS refers to a signal used to indicate whether a UE should monitor a PDCCH (MPDCCH or NPDCCH) to receive paging (in a specific cell). The WUS is associated with one or more POs according to whether extended discontinuous reception (DRX) is configured.

A UE (which has received the WUS) may additionally perform the afore-described DRX operation and/or cell reselection operation.

A more specific UE operation and BS operation related to reception of a WUS (e.g., MTC wake-up signal (MWUS) or narrowband wake-up signal (NWUS) may be summarized as follows and may apparently be described in relation to methods described later.

(1) Base Station (BS) Operation

A BS first generates a sequence (used) for a WUS in a specific subframe. For example, the BS may generate the sequence (used) for the WUS by using an equation defined in 3GPP technical specification (TS) 36.211 V15.2.0. More specifically, the sequence w(m) (used) for the WUS may be generated based on Equation 3.

$$w(m) = \theta_{n_f,n_s}(m') \cdot e^{\frac{j\pi un(n+1)}{131}} \quad \text{Equation 3}$$

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 1 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$u = (N_{ID}^{Ncell} \bmod 126) + 3$$

In Equation 3, x represents a subframe carrying the WUS, ranging from 0 to M−1 where M is the number of subframes carrying the WUS, corresponding to an actual WUS duration. Further, in Equation 3, $$e^{\frac{j\pi un(n+1)}{131}}$$

represents a Zadoff-Chu (ZC) sequence and $\theta_{n_f,n_s}(m')$ represents a complex-valued symbol related to a scrambling sequence. $N_{ID}^{Ncell}$ represents a physical layer cell identity (ID), and $c_{n_f,n_s}(i)$ represents a scrambling sequence which may have a sample length of 2*132M. Herein, i may range from 0 to 2*132M−1. The scrambling sequence may be given based on a Gold sequence.

The BS maps the generated sequence to at least one resource element (RE), and transmits the WUS on the mapped RE(s) to a UE.

In concept, the at least one RE may cover at least one of a time resource, a frequency resource, or an antenna port.

(2) User Equipment (UE) Operation

Figure 26:
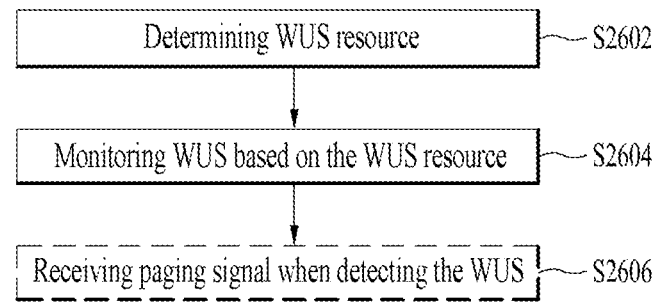
FIG. 26 illustrates a flowchart of a method according to the present disclosure.

The UE receives the WUS from the BS (or the UE may assume that the WUS is transmitted on specific RE(s) from the BS) (e.g., refer to step S2604 in FIG. 26).

The UE may then identify (or determine) whether paging will be received, based on the received WUS (e.g., refer to step S2606 in FIG. 26).

When paging is transmitted, the UE receives the paging based on the afore-described paging reception-related operation, and performs an RRC idle mode-to-RRC connected mode transmission procedure.

G.1 UE Sub-Grouping Criteria

The present disclosure proposes a method of determining a condition for applying UE sub-grouping and configuring the UE sub-grouping by a base station and a method of recognizing and performing the UE sub-grouping by a UE, when the UE sub-grouping is applied to WUS transmission and reception. One or a combination of two or more of the following Method 1-1, Method 1-2, Method 1-3, Method 1-4, Method 1-5, Method 1-6, or Method 1-7 can be used as a method of performing the UE sub-grouping.

[Method 1-1] Method of Performing UE Sub-Grouping for a WUS Based on UE_ID

In Method 1-1, it is proposed that UE sub-grouping is performed for a WUS based on the UE_IDs of UEs. UE_ID is UE identification information based on an international mobile subscriber identity (IMSI). Characteristically, the definition of UE_ID used to determine a PO in 3GPP TS 36.304 V15.0.0. may be used for UE_ID herein. For example, when a P-RNTI is monitored on a PDCCH, UE_ID may be given as (IMSI mod 1024). When a P-RNTI is monitored on an NPDCCH, UE_ID may be given as (IMSI mod 4096). When a P-RNTI is monitored on an MPDCCH, UE_ID may be given as (IMSI mod 16394). Herein, mod represents a modulo operation.

A PF, a PO, and a paging narrowband (PNB) are determined based on DRX parameters provided in system information according to Equation 4, Equation 5, and Equation 6.

Specifically, the PF is determined by Equation 4.

$$\text{SFN mod } T = (T \text{ div } N)^*(\text{UE\_ID mod } N) \quad \text{Equation 4}$$

An index i_s indicating a PO from a paging-related subframe pattern is derived by Equation 5.

$$i\_s = \text{floor}(\text{UE\_ID}/N) \text{mod } N_s \quad \text{[Equation 5]}$$

When the P-RNTI is monitored on the MPDCCH (or NPDCCH), the PNB is determined by Equation 6.

$$\text{PNB} = \text{floor}(\text{UE\_ID}/(N^*N_s)) \text{mod } N_n \quad \text{Equation 6}$$

The parameters used in Equation 4, Equation 5, and Equation 6 are defined as follows, mod represents a modulo operation, floor represents a floor function, / represents division, * represents multiplication, div represents a function of obtaining a quotient, min(A, B) represents the smaller value among A and B, and max (A, B) represents the larger value among A and B.

T: DRX cycle of the UE nB: 4T, 2T, T, T/2, T/4, T/8, T/16, T/32, T/64, T/128, and T/256, and for NB-IoT also T/512, and T/1024

N: min(T,nB)

$N_s$: max(1,nB/T)

$N_n$: number of paging narrowbands (for P-RNTI monitored on MPDCCH) or paging carriers (for P-RNTI monitored on NPDCCH) provided in system information Uniform Sub-Grouping Method As a characteristic example of Method 1-1, a method of uniformly distributing UE_IDs to UE sub-groups may be considered. In MTC, when the index of each UE sub-group is defined as $c_g$ based on UE_IDs, $c_g$ may be determined by Equation (Eq-1-1-a-MTC). In NB-IoT, when the index of each UE sub-group is defined as $c_g$ based on UE_IDs, $c_g$ may be determined by Equation (Eq-1-1-a-NB). In Equation (Eq-1-1-a-MTC) and Equation (Eq-1-1-a-NB), UE_ID, $N_s$, $N_n$, and W conform to the definitions of Section 7 of 3GPP TS 36.304 V15.0.0 (e.g., refer to the description related to Equation 4, Equation 5, and Equation 6). $N_{SG}$ represents the number of deployed sub-groups. The UE may select a WUS resource (e.g., a time-domain resource, frequency-domain resource, and/or code-domain resource) corresponding to a UE sub-group index calculated by Equation (Eq-1-1-a-MTC) or Equation (Eq-1-1-a-NB) and monitor a WUS in the selected WUS resource.

$$c_g = \text{floor}(\text{UE\_ID}/(N^*N_S^*N_n)) \text{mod } N_{SG} \quad \text{(Eq-1-1-a-MTC)}$$

$$c_g = \text{floor}(\text{UE\_ID}/(N^*N_S^*W)) \text{mod } N_{SG} \quad \text{(Eq-1-1-a-NB)}$$

When sub-group index 0 ($c_g$=0) is used as an index for representing a common WUS (e.g., a WUS that all WUS-capable UEs may identify irrespective of UE sub-groups), Equation (Eq-1-1-a-MTC2) or Equation (Eq-1-1-a-NB2) may be used to prevent a specific UE sub-group from selecting subgroup index 0 ($c_g$=0).

$$c_g = \text{floor}(\text{UE\_ID}/(N^*N_S^*N_n)) \text{mod } N_{SG}+1 \quad \text{(Eq-1-1-a-MTC2)}$$

$$c_g = \text{floor}(UE\_ID/(N^*N_S^*W)) \text{mod } N_{SG}+1 \quad \text{(Eq-1-1-a-NB2)}$$

Non-Uniform Sub-Grouping Method

As another characteristic example of Method 1-1, a method of non-uniformly distributing UE_IDs to UE sub-groups may be considered. This may be intended to reduce the selection frequency of a WUS resource corresponding to a specific UE sub-group. For example, when a WUS corresponding to a specific UE sub-group shares the same resource with a legacy WUS (e.g., a WUS for a UE to which UE sub-grouping is not applied), the above operation may be intended to control effects on legacy WUS-capable UEs. In MTC, when the index of each UE sub-group is defined as $c_g$ based on UE_IDs, $c_g$ may be determined to be a smallest index $c_g$ ($0 \le c_g \le N_{SG}-1$) satisfying Equation (Eq-1-1-b-MTC). In NB-IoT, $c_g$ may be determined to be a smallest index $c_g$ ($0 \le c_g \le N_{SG}-1$) satisfying Equation (Eq-1-1-b-NB). $N_{SG}$ represents the number of used sub-groups. In Equation (Eq-1-1-b-MTC) and Equation (Eq-1-1-b-NB), UE_ID, $N_S$, $N_n$, and W are defined in Section 7 of 3GPP TS 36.304 V15.0.0 (e.g., refer to the descriptions of Equation 4, Equation 5, and Equation 6). In the following mathematical formula, $W_{WUS}(n)$ represents a weight for an $n^{th}$ UE sub-group, for non-uniformly distributing UE_IDs to UE sub-groups so that each UE sub-group includes a different number of UE_IDs, and $W_{WUS}$ represents the sum of the weights of all sub-groups. Accordingly, $W_{WUS} = W_{WUS}(0) + W_{WUS}(1) + \ldots + W_{WUS}(N_{SG}-1)$.

$$\text{floor}(\text{UE\_ID}/(N^*N_S^*N_n)) \text{mod } W_{WUS} < W_{WUS}(0) + W_{WUS}(1) + \ldots + W_{WUS}(c_g) \quad \text{(Eq-1-1-b-MTC)}$$

$$\text{floor}(\text{UE\_ID}/(N^*N_{S^*W})) \text{mod } W_{WUS} < W_{WUS}(0) + W_{WUS}(1) + \ldots + W_{WUS}(c_g) \quad \text{(Eq-1-1-b-NB)}$$

$W_{WUS}(n)$ corresponding to a specific index may be determined to be a weight for a sub-group sharing the same resource with a legacy WUS (e.g., $W_{WUS}(0)$).

When sub-group index 0 ($c_g$=0) is used as an index indicating a common WUS (e.g., a WUS that all WUS-capable UEs may identify irrespective of UE sub-groups), Equation (Eq-1-1-b-MTC2) or Equation (Eq-1-1-b-NB2)

may be used to prevent a specific UE sub-group from selecting subgroup index 0 ($c_g$=0).

$$\text{floor}(UE\_ID/(N*N_S*N_n)) \bmod W_{WUS} < W_{WUS}(1) + W_{WUS}(2) + \ldots + W_{WUS}(c_g) \quad \text{(Eq-1-1-b-MTC2)}$$

$$\text{floor}(UE\_ID/(N*N_S*W)) \bmod W_{WUS} < W_{WUS}(1) + W_{WUS}(2) + \ldots + W_{WUS}(c_g) \quad \text{(Eq-1-1-b-NB2)}$$

In the above mathematical formula, $c_g$ may be determined to satisfy the condition that $1 \le c_g \le N_{SG}$.

The values of $W_{WUS}(n)$ may be signaled by a system information block (SIB) or higher-layer signaling such as radio resource control (RRC) signaling. This signaling may be intended to adjust distribution of UE_IDs per sub-group according to a situation. For example, the base station (BS) may configure $N_{SG}$ weights for the respective sub-groups by an SIB. This operation may advantageously lead to flexible control of UE_ID distribution ratios across all sub-groups. In another example, the BS may configure a weight (e.g., $W_{WUS}(0)$) for a sub-group sharing the same resource with a legacy WUS and a weight (e.g., $W_{WUS}(n)$, for all n not zero) for a sub-group using a different resource from the legacy WUS by an SIB. This operation may be intended to uniformly distribute UE_IDs among sub-groups using resources distinguished from resources for the legacy WUS, while variably controlling effects on the legacy WUS. In another example, the BS may configure a ratio between a weight for a sub-group sharing the same resource with the legacy WUS and a weight for a sub-group using a different resource from the legacy WUS by an SIB. This operation may advantageously reduce signaling overhead under the premise that the resources used for the legacy WUS are always used for a specific sub-group. Instead of the ratio between the two weights, the weight for the sub-group sharing the same resource with the legacy WUS may always be fixed to 1, while only the weight for the sub-group using a different resource from the legacy WUS may be configured.

In another method of non-uniformly distributing UE_IDs to UE sub-groups, the indexes of the UE sub-groups may be determined by a method of uniformly distributing UE_IDs (e.g., Eq-1-1-a-MTC or Eq-1-1-a-NB), and a WUS resource corresponding to each sub-group index may be determined by an SIB or higher-layer signaling such as RRC signaling. Herein, when UE_IDs are non-uniformly distributed such that a plurality of sub-group indexes correspond to a specific WUS resource, the effect that the number of UE_IDs is non-uniform for each WUS resource may be expected.

[Method 1-2] Method of Performing UE Sub-Grouping for a WUS Based on Coverage Levels.

In Method 1-2, it is proposed that UE sub-grouping is performed for a WUS based on the coverage levels of UEs. The coverage level of a UE refers to the state of a wireless channel environment in which the UE is placed. In a characteristic example, a coverage level may be represented by, for example, a measurement such as reference signal received power (RSRP)/reference signal received quality (RSRQ) measured by the UE or a repetition number that the UE uses to transmit and receive an uplink (UL) or downlink (DL) channel.

An RSRP/RSRQ value may be represented as quality information related a channel quality.

In Method 1-2, when a UE identifies a change in its coverage level, the UE may indicate the change to a BS. In a characteristic example, when an RSRP/RSRQ value measured by the UE changes and thus does not satisfy the coverage level requirement of a current UE sub-group, the UE may indicate the change of the coverage level to the BS in a random access procedure. In a more specific example, the UE may use an idle-mode UL data transmission scheme such as early data transmission (EDT) to avoid unnecessary transition to the RRC connected mode. To ensure stable reporting of the coverage level of the UE, the BS may configure an additional RACH resource for coverage level reporting and indicate the configuration to the UE.

[Method 1-3] Method of Performing UE Sub-Grouping for a WUS by Dedicated Signaling from a BS (eNB or gNB).

In Method 1-3, when UE sub-grouping of UEs is indicated by UE-specific dedicated signaling, a method to be applied is proposed.

In a specific method of applying Method 1-3, UE-specific dedicated signaling may be dedicated RRC signaling that a UE obtains during RRC connection setup or in the RRC connected mode. For this purpose, a UE may report information required for configuring UE sub-grouping (e.g., a coverage level, a type of service, a capability, and so on) on an NPUSCH.

In another specific method of applying Method 1-3, UE-specific dedicated signaling may be information that the UE obtains in a step for Msg2 or Msg4 of an RACH procedure (or random access procedure). For this purpose, the UE may report information required for configuring UE sub-grouping (e.g., a coverage level, a type of service, a capability, and so on) in a step for Msg1 or Msg3.

[Method 1-4] Method of performing UE sub-grouping for a WUS based on the usage of a corresponding channel indicated by the WUS.

In Method 1-4, it is proposed that UE sub-grouping of UEs is applied based on a corresponding channel indicated by a WUS. The corresponding channel refers to a channel about which the WUS indicates information.

Capability Report

In a specific method of applying Method 1-4, for UE sub-grouping, the UE may report its capability for a corresponding channel supported by the UE. After the UE reports the capability, UE sub-grouping may be performed only when the BS provides the UE with additional signaling information. For example, the additional signaling information may be dedicated signaling as proposed in Method 1-3 or information that enables/disables WUS support for a specific corresponding channel obtainable in the RRC idle mode, such as an SIB.

UE Behavior and Corresponding Channel Identification)

In Method 1-4, after UE sub-grouping, the UE may monitor only a WUS corresponding to its UE sub-group. When the WUS indicates multiple corresponding channels, the UE may identify information about a corresponding channel by comparing bit information included in a subsequent control channel or masked RNTIs, or may finally confirm information about the corresponding channel on a data channel indicated by the subsequent control channel.

Alternatively in Method 1-4, after the UE sub-grouping is determined, the UE may monitor all available WUSs that can be monitored, irrespective of a WUS corresponding to its UE sub-group and a UE sub-grouping capability. When a WUS indicates multiple corresponding channels, the UE may distinguish the corresponding channels by distinguishing WUS resources (e.g., time-domain, frequency-domain, and/or code-domain resources). In a characteristic example, the UE may simultaneously monitor a WUS serving a purpose other than paging, which is distinguishable by a sequence (and/or frequency) in a specific time resource (e.g., a subframe period determined by a gap from a PO and a maximum duration) in which the UE monitors a WUS for paging. The UE may determine how a subsequent corresponding channel will be transmitted, based on a detected WUS.

Examples of Corresponding Channel in Method 1-4 Other than Paging DCI

In an example of Method 1-4, the defined corresponding channel may be a UL resource for a preconfigured UL transmission (e.g., semi-persistent scheduling (SPS)). A WUS for which UE sub-grouping has been performed may be used for activating/deactivating the use of the preconfigured UL resource or indicating an ACK/NACK or a retransmission for the preconfigured UL resource.

In an example of Method 1-4, the defined corresponding channel may be a DL resource for a preconfigured UL transmission (e.g., SPS). A WUS for which UE sub-grouping has been performed may be used to indicate whether DCI providing information related to the preconfigured UL transmission is transmitted.

In an example of Method 1-4, the defined corresponding channel may be DCI masked by a G-RNTI (or SC-RNTI) in single cell point to multipoint (SC-PTM). A WUS for which UE sub-grouping has been performed may be used to indicate whether DCI masked by a G-RNTI (or SC-RNTI) is transmitted or whether a single cell multicast transport channel (SC-MTCH)(or single cell multicast control channel (SC-MCCH)) has been modified. When a WUS indicates whether DCI masked by a G-RNTI is transmitted, different UE sub-groups may be configured in correspondence with different G-RNTIs. When both of DCI masked by an SC-RNTI and DCI masked by a G-RNTI are subjected to UE sub-grouping, different UE sub-groups may be configured in correspondence with the SC-RNTI and the G-RNTI.

In an example of Method 1-4, the defined corresponding channel may have a multi-TB transmission structure. A WUS for which UE sub-grouping has been performed may be used to activate/deactivate the use of the multi-TB transmission structure. Alternatively, the WUS may be used to indicate whether a subsequent corresponding channel is in a DCI format supporting multi-TB transmission or a DCI format supporting single-TB transmission. Multi-TB transmission refers to a transmission structure in which a plurality of traffic channels (e.g., (N)PDCCH or (N)PUSCH) are scheduled by one DCI (or a preconfigured resource without DCI).

[Method 1-5] Method of Performing UE Sub-Grouping for a WUS Only Based on a Cell (or Carrier) for which a UE has Obtained UE Sub-Grouping Information.

In Method 1-5, it is proposed UE sub-grouping is applied only to a cell for which a UE has obtained UE sub-grouping information. In NB-IoT, when UE sub-grouping information is provided carrier-specifically, the term cell may be replaced with carrier.

In a specific method of applying Method 1-5, when UE sub-grouping is applied according to specific criteria (e.g., UE_ID, a coverage level, dedicated signaling, a corresponding channel, and so on), a UE may perform a UE sub-grouping-related operation only for a cell for which the UE has been configured with UE sub-grouping information, skipping the UE sub-grouping-related operation for a cell for which the UE has not been configured with UE sub-grouping information. The UE may not expect a WUS-related operation until before obtaining UE sub-grouping information in an adjacent cell or a new cell, or may perform the WUS-related operation in a WUS resource (e.g., a WUS defined in Rel-15) which may be monitored UE-commonly irrespective of UE sub-grouping criteria.

[Method 1-6] Method of Performing UE Sub-Grouping Based on a Time Passed after the Last UL Transmission and/or DL Reception.

In Method 1-6, it is proposed that a UE is included in a specific UE sub-group based on a time of completing the last UL transmission and/or DL reception, and then switched to another UE sub-group a predetermined time later or skipping UE sub-grouping until before the next UL transmission and/or DL reception is completed. The proposed method may be useful when there is a low possibility that the UE will be paged during a predetermined time after transmitting or receiving traffic.

In a specific method for which Method 1-6 is applied, Method 1-6 may be applied only to a case where the BS and the UE are capable of confirming transmission and reception of a channel to which the UL transmission and/or the DL reception is directed. For example, this case may correspond to a case in which the UE and the BS exchange information as is done in the EDT, a case in which whether a specific channel has been received may be feed backed through an HARQ-ACK channel, or a case of an RRC message.

[Method 1-7] Method of Hopping the Sub-Group Index of a UE.

In Method 1-7, it is proposed that when there is a fixed WUS resource corresponding to each sub-group index, the WUS sub-group index of a UE hops over time. This operation may be intended to prevent continuous performance degradation caused by the use of a specific WUS resource at a UE, when there is a difference in feature or gain between WUS resources used for sub-grouping.

In a specific method of Method 1-7, the UE may determine that the sub-group index of a corresponding WUS hops in each PO. A selected sub-group index may be maintained unchanged during a time period in which a WUS transmission starts and is repeated.

In a specific method of Method 1-7, when sub-group index hopping is determined by a system frame number (SFN), a parameter such as floor(SFN/T) may be used to achieve hopping effects. In a characteristic example, when a sub-group index is hopped every period of a DRX cycle, the value of T may be determined to be the value of the DRX cycle. Herein, floor( ) represents a floor function.

In an example of Method 1-7, when the UE_ID-based uniform distribution method proposed in Method 1-1 and sub-group index hopping are applied, a sub-group index may be determined by Equation (Eq-1-7-a-MTC) for MTC, and Equation (Eq-1-7-a-NB) for NB-IoT Alternatively, in an example of Method 1-7, when the UE_ID-based non-uniform distribution method proposed in Method 1-1 and sub-group index hopping are applied, a sub-group index may be determined by Equation (Eq-1-7-b-MTC) for MTC, and Equation (Eq-1-7-b-NB) for NB-IoT In Equations (Eq-1-7-a-MTC), (Eq-1-7-a-NB), (Eq-1-7-b-MTC), and (Eq-1-7-b-NB), is a parameter used to achieve sub-group index hopping effects, which is defined as a variable determined by a reference value distinguishable on the time axis. For example, when an SFN and a DRX cycle are used as references, it may be defined that $\beta=floor(SFN/T)$ For the other parameters than $\beta$ and operations, Equations (Eq-1-1-a-MTC), (Eq-1-1-a-NB), (Eq-1-1-b-MTC), and (Eq-1-1-b-NB) are used in the same manner.

$$c_g = [floor(UE\_ID/(N^* N_S^* N_n)) + \beta] \bmod N_{SG} \quad \text{(Eq-1-7-a-MTC)}$$

$$c_g = [floor(UE\_ID/(N^* N_S^* W)) + \beta] \bmod N_{SG} \quad \text{(Eq-1-7-a-NB)}$$

$$[floor(UE\_ID/(N^* N_S^* N_n)) + \beta] \bmod W_{WUS} < W_{WUS}(0) + W_{WUS}(1) + \ldots + W_{WUS}(c_g) \quad \text{(Eq-1-7- b-MTC)}$$

$$[\text{floor}(\text{UE\_ID}/(N^*N_S{}^*W))+\beta]\bmod \; W_{WUS}<W_{WUS}(0)+ \\ W_{WUS}(1)+\ldots+W_{WUS}(c_g) \qquad \text{(Eq-1-7-b-NB)}$$

In another method to achieve the same effects as Method 1-7, a mapping relationship between sub-group indexes and WUS resources may be changed over time, with the sub-group index of a UE fixed.

G.2 UE Sub-Grouping Configuration

The present disclosure proposes a method of configuring related information by a base station (BS) and operations performed by a user equipment (UE), to apply UE sub-grouping to WUS transmission and reception. One or a combination of two or more of the following Method 2-1, Method 2-2, Method 2-3, or Method 2-4 may be used as a method of configuring UE sub-grouping.

[Method 2-1] Unit of Applying UE Sub-Grouping Information

In Method 2-1, when UE sub-grouping is configured, a method of determining a range to which the UE sub-grouping configuration is applied and related operations are proposed.

In Method 2-1, a unit for which UE sub-grouping information is configured may be a cell. This may be intended to reduce signaling overhead. Alternatively, when hopping is applied to a WUS, this may be intended to maintain the same WUS configuration irrespective of the transmission position (e.g., narrowband or carrier) of the WUS.

In Method 2-1, a unit for which UE sub-grouping information is configured may be a carrier in NB-IoT. Because a WUS is repeated a different number of times, power boosting is available or unavailable, or a different number of resources are available in each carrier, a carrier may be set as the unit in order to control the type of UE sub-grouping or the number of UE sub-groups, or enable/disable UE sub-grouping in consideration of the difference. In MTC, the term carrier may be replaced with narrowband. When frequency hopping is applied between narrowbands, a UE sub-grouping criterion may be determined to be a narrowband carrying a corresponding channel indicated by a WUS.

In Method 2-1, a unit for which UE sub-grouping is configured may be a corresponding channel indicated by a WUS. For example, when UE sub-grouping is applied to paging, a carrier (or narrowband) for which UE sub-grouping is supported may be limited to a carrier carrying paging. Alternatively, for example, when UE sub-grouping is applied to SC-PTM, SPS, or multi-TB transmission, UE sub-grouping may be performed only on a carrier (or narrowband) in which a transmission and reception structure for each purpose is operated.

[Method 2-2] Method of Determining Whether UE Sub-Grouping is Applied According to the Gap Capability of a UE.

In Method 2-2, it is proposed that UE sub-grouping configurations are differentiated according to the WUS-to-PO gap capabilities of UEs. A WUS-to-PO gap capability of a UE refers to a UE capability used to determine the size of a gap configured between the ending subframe of a WUS and a PO and may be defined as in 3GPP TS 36.304 V15.0.0.

In a specific method of applying Method 2-2, a configuration related to UE sub-grouping may be independently set for each WUS-to-PO gap capability. For example, a higher-layer signal carrying UE sub-grouping-related configuration information may be designed to have an independent field for each WUS-to-PO gap capability.

In a specific method of applying Method 2-2, UE sub-grouping may not be applied to a UE having a specific WUS-to-PO gap capability. For example, UE sub-grouping may not be applied to a large gap-capable UE (e.g., a UE configurable with a WUS-to-PO gap of {1s, 2s} in an eDRX situation). Alternatively, in a contrary example, UE sub-grouping may not be applied to a short gap-capable UE (e.g., a UE unconfigurable with the WUS-to-PO gap of {1s, 2s} in the eDRX situation).

Considering that the implementation complexity and performance of a WUS detector may be different according to a WUS-to-PO gap capability, the method proposed in Method 2-2 may be intended to reduce an increase in UE complexity for UE sub-grouping or the degradation of WUS detection performance for a UE having a capability with a relatively low requirement (e.g., a larger cap capability). Alternatively, the method may be intended to reduce the degradation of WUS detection performance caused by UE sub-grouping for a UE having a shorter gap capability, to secure a sufficient time required to prepare for monitoring a corresponding channel after fast WUS detection.

[Method 2-3] Method of Determining Whether UE Sub-Grouping is Applied According to the Size of a Gap Configured by a BS In Method 2-3, it is proposed that UE sub-grouping configurations are differentiated according to a configured size of a WUS-to-PO gap. The size of a WUS-to-PO gap refers to the size of a gap configured between the ending subframe of a WUS and a PO, and may be defined as in 3GPP TS 36.304 V15.0.0.

That is, a gap mentioned in Method 2-3 may be a gap illustrated in the afore-described drawing (e.g., FIG. 25) illustrating a WUS timing.

In a specific method of applying Method 2-3, a configuration related to UE sub-grouping may be independently set for each WUS-to-PO gap size. For example, a BS may configure two or more gaps corresponding to one PO, and a higher-layer signal carrying UE sub-grouping-related configuration information may be designed to have an independent field for each WUS-to-PO gap size.

In a specific method of applying Method 2-3, UE sub-grouping may not be applied for a specific WUS-to-PO gap size. For example, UE sub-grouping may not be applied to a larger gap (e.g., a gap size of {1s, 2s} configured in an eDRX situation). This is because for a larger gap, a separate WUS receiver operating with low complexity may be applied, and in this case, the degradation of WUS performance caused by UE sub-grouping may be relatively serious. Alternatively, in a contrary example, UE sub-grouping may not be applied to a shorter gap (e.g., a configured gap size of {40 ms, 80 ms, 160 ms, 240 ms}). This may be intended to secure an extra spacing by shortening an actual transmission duration instead of performing UE sub-grouping because there is a relative shortage of an extra spacing between a WUS and a PO.

In another specific method of applying Method 2-3, UE sub-grouping may be applied depending on whether a UE performs an eDRX operation. For example, UE sub-grouping may not be applied in eDRX. This is intended to prevent the degradation of WUS detection performance caused by UE sub-grouping because missed paging may lead to a fatal delay to the next paging transmittable time in eDRX. Alternatively, in another method for the same purpose, a separate configuration may be used, which distinguishes UE sub-grouping for an eDRX operation from UE sub-grouping for a DRX operation.

[Method 2-4] Method of Reporting Information Related to its Mobility for UE Sub-Grouping by a UE In Method 2-4, it is proposed that a UE reports information related to its mobility for UE sub-grouping. The mobility may mean a change in a communication channel environment, caused by movement of the UE to another physical position.

In a specific method of applying Method 2-4, the UE may autonomously determine whether to perform UE sub-grouping based on its mobility and report the determination to the BS. In the presence of a UE sub-grouping request report based on the mobility of the UE, the BS may transmit a WUS by applying a UE sub-grouping-related operation for the UE. The UE may identify that the UE sub-grouping operation is possible at a transmission position at which the UE expects a WUS, and perform the UE sub-grouping-related operation after transmitting a UE sub-groping-capable report based on its mobility to the BS. Alternatively, the UE may start UE sub-grouping after receiving separate confirmation signaling for the report. In this method, (1) a reference predetermined in a standard or (2) a reference configurable by higher-layer signaling from the BS may be used as reference mobility for determining whether to perform UE sub-grouping by the UE.

In a specific method of applying Method 2-4, the UE may report information about its mobility to the BS, and the BS may determine whether UE sub-grouping is to be performed based on the report and configure the determination result for the UE. After reporting the information about its measured mobility, the UE may expect signaling indicating whether UE sub-grouping is to be performed from the BS. Upon acquisition of information related to UE sub-grouping, the UE may determine whether to apply UE sub-grouping according to the received information. Whether the UE fails to acquire the information about UE sub-grouping, the UE may monitor a common WUS (e.g., a WUS identifiable by all WUS-capable UEs irrespective of UE sub-groups), without expecting a UE sub-grouping-related operation.

Characteristically in applying Method 2-4, when the BS operates UE sub-grouping based on a plurality of criteria or purposes, the mobility-based report may be restrictively reflected in specific UE sub-grouping criteria. For example, because the coverage level of a UE with mobility may change over time, it may be determined whether coverage level-based UE sub-grouping is to be applied according to a mobility-based report. In contrast, a criterion such as UE_ID is applicable without much relation to the mobility of a UE, UE_ID-based UE sub-grouping may always be applied irrespective of the mobility-based report information.

G.3 Flowcharts of Methods of the Present Disclosure

FIG. 26 is an exemplary flowchart illustrating a method of the present disclosure. While the example of FIG. 26 is described in the context of a user equipment (UE), an operation corresponding to the operation illustrated in FIG. 26 may be performed by a base station (BS). As described before, Method 1-1 to Method 1-7 of the present disclosure may be performed independently, or in combination of one or more of them.

In step S2602, a UE may determine a WUS resource based on UE sub-grouping for a WUS.

For example, in step S2602, the UE may determine index information (e.g., UE sub-group index information $c_g$) indicating a WUS resource based on identification information (e.g., UE_ID) of the UE and determine a WUS resource related to a sub-group of the UE based on the determined index information (e.g., refer to the description of Method 1-1). For example, when the UE supports MTC, the index information indicating the WUS resource may be determined based on the identification information (e.g., UE_ID) of the UE, parameters (e.g., N and $N_s$) related to a DRX cycle of the UE, information (e.g., $N_n$) about the number of paging narrowbands, and information (e.g., $N_{SG}$) about the number of UE groups for the WUS (e.g., refer to Eq-1-1-a-MTC). When the UE supports MTC, the index information indicating the WUS resource may be determined based on the identification information (e.g., UE_ID) of the UE, the parameters (e.g., N and $N_s$) related to the DRX cycle of the UE, the information (e.g., $N_n$) about the number of paging narrowbands, and information (e.g., $W_{WUS}$) about the sum of weights of all UE sub-groups (e.g., refer to Eq-1-1-b-MTC). In another example, when the UE supports NB-IoT, the index information indicating the WUS resource may be determined based on the identification information (e.g., UE_ID) of the UE, the parameters (e.g., N and $N_s$) related to the DRX cycle of the UE, information about the sum (e.g., W) of weights of paging carriers, and the information (e.g., $N_{SG}$) about the number of UE groups for the WUS (e.g., refer to Eq-1-1-a-NB). Alternatively, when the UE supports NB-IoT, the index information indicating the WUS resource may be determined based on the identification information (e.g., UE_ID) of the UE, the parameters (e.g., N and $N_s$) related to the DRX cycle of the UE, the information about the sum (e.g., W) of the weights of the paging carriers, and the information (e.g., $W_{WUS}$) about the sum of the weights of all UE sub-groups (e.g., refer to Eq-1-1-b-NB).

Independently or additionally, the UE may determine a WUS resource based on a coverage level (e.g., refer to Method 1-2) in step S2602. For example, the coverage level of a UE refers to the state of a wireless channel environment in which the UE is placed. In a characteristic example, a measurement such as a UE-measured RSRP/RSRQ or a repetition number used for the UE to transmit a UL channel or receive a DL channel may be used as the coverage level.

Independently or additionally, in step S2602, the UE may receive UE-specific dedicated signaling from the BS. When the dedicated signaling indicates UE sub-grouping, the UE may report information for configuring UE sub-grouping (e.g., a coverage level, a type of service, a capability, and so on) via a PUSCH (e.g., NPUSCH), Msg1, or Msg3 (e.g., refer to Method 1-3).

Independently or additionally, in step S2602, the UE may determine a WUS resource only for a cell (or carrier) for which the UE has acquired UE sub-grouping information, based on UE sub-grouping (e.g., refer to Method 1-5).

Independently or additionally, in step S2602, the UE may determine a UE sub-group and a WUS resource corresponding to the UE sub-group, based on a time of completing the last UL transmission and/or DL reception (e.g., refer to Method 1-6).

Independently or additionally, in step S2602, UE sub-group index information and/or a WUS resource corresponding to the UE sub-group index information may hop over time by the UE (e.g., refer to Method 1-7). More specifically, the UE sub-group index information and/or the WUS resource corresponding to the UE sub-group index information may be determined based on an SFN (e.g., refer to Method 1-7).

Independently or additionally, the WUS may be used to indicate transmission and reception of a channel as well as a paging signal. The UE may determine a WUS resource based on the channel (e.g., corresponding channel) indicated by the WUS (e.g., refer to Method 1-4). In this case, the UE may report a capability for a channel (e.g., corresponding channel) supported for UE sub-grouping to the BS, and the BS may indicate to the UE to determine a WUS resource based on UE sub-grouping by separate signaling information (e.g., refer to Method 1-4).

In step S2604, the UE may monitor a WUS based on the WUS resource. For example, the UE may monitor the WUS based on the index information (e.g., the UE sub-group index information $c_g$) determined in step S2602 (or based on the WUS resource indicated by the index information) (e.g., refer to Method 1-1). Alternatively, for example, the UE may monitor the WUS based on a WUS resource corresponding to the coverage level determined in step S2602 (e.g., refer to Method 1-2).

Independently or additionally, when the index information indicating a WUS resource (e.g., the UE sub-group index information $c_g$) (and/or the WUS resource corresponding to the index information) hops over time, the UE may monitor the WUS based on the hopped index information (and/or the WUS resource corresponding to the hopped index information) (e.g., refer to Method 1-7).

Upon detection of the WUS in step S2604, the UE may receive a paging signal in a PO related to the detected WUS in step S2606. As described before, the WUS may be used to indicate whether a paging signal will be transmitted and received, and also whether a channel (e.g., corresponding channel) other than the paging signal will be transmitted and received (e.g., refer to Method 1-4). For example, the channel (e.g., corresponding channel) related to the WUS may be a UL resource for a preconfigured UL transmission (e.g., SPS), a DL resource for a preconfigured DL transmission (e.g., SPS), DCI masked by a G-RNTI (or SC-RNTI) in SC-PTM, an SC-MTCH (or SC-MCCH), and/or a channel of a multi-TB transmission structure (refer to Method 1-4). When multiple channels (e.g., corresponding channels) are related to the WUS, the UE may determine and receive the channel related to the WUS based on bit information included in a control channel, an RNTI by which the control channel is masked, information received on a data channel indicated by the control channel, and/or the WUS resource (e.g., refer to Method 1-4).

When the UE fails to detect the WUS in step S2604, the UE may skip reception of a paging signal related to the WUS in step S2606.

The UE (which has received the WUS) may additionally perform the afore-described DRX operation and/or cell reselection operation.

The operations described in Method 1-1 to Method 1-7 and/or a combination thereof may be performed in the steps of FIG. 26, and the description of Method 1-1 to Method 1-7 is incorporated by reference in the description of FIG. 26 in its entirety.

G.4 Communication System and Devices to which the Present Disclosure is Applied

Various descriptions, functions, procedures, proposals, methods, and/or flowcharts of the present disclosure may be applied to, but not limited to, various fields requiring wireless communication/connection (e.g., 5G) among devices.

Hereinafter, they will be described in more detail with reference to the drawings. In the following drawings/description, the same reference numerals may denote the same or corresponding hardware blocks, software blocks, or functional blocks, unless specified otherwise.

Figure 27:
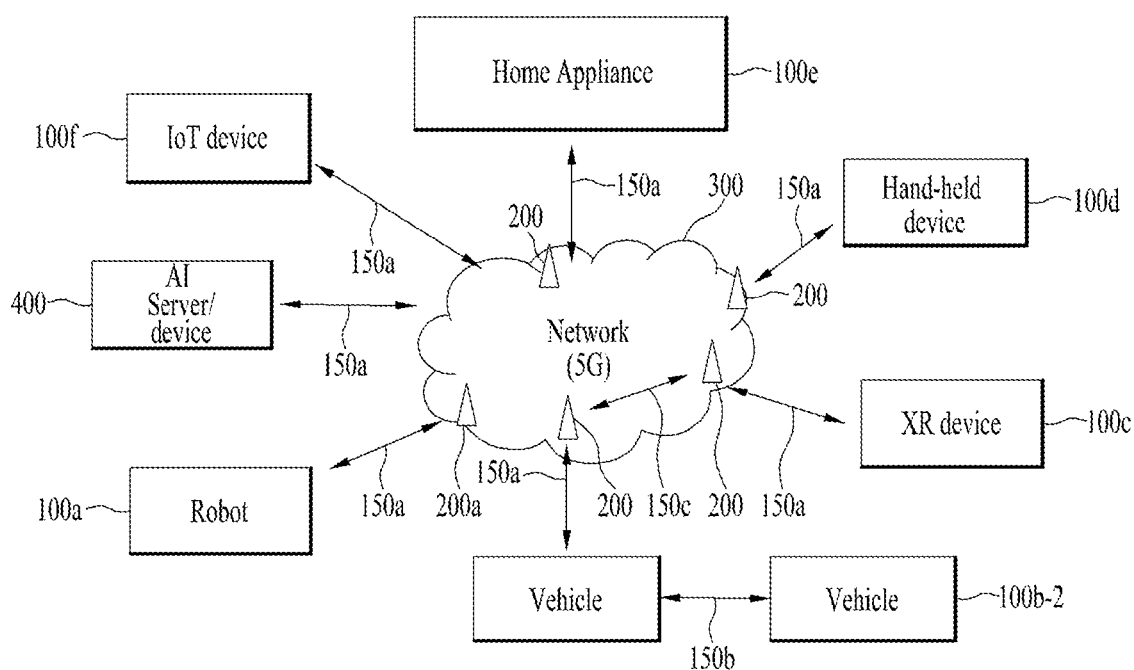
FIG. 27 to FIG. 32 illustrate examples of a system and an apparatus to which the methods proposed in the present disclosure are applicable.

FIG. 27 illustrates a communication system 1 applied to the present disclosure.

Referring to FIG. 27, the communication system 1 applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 28:
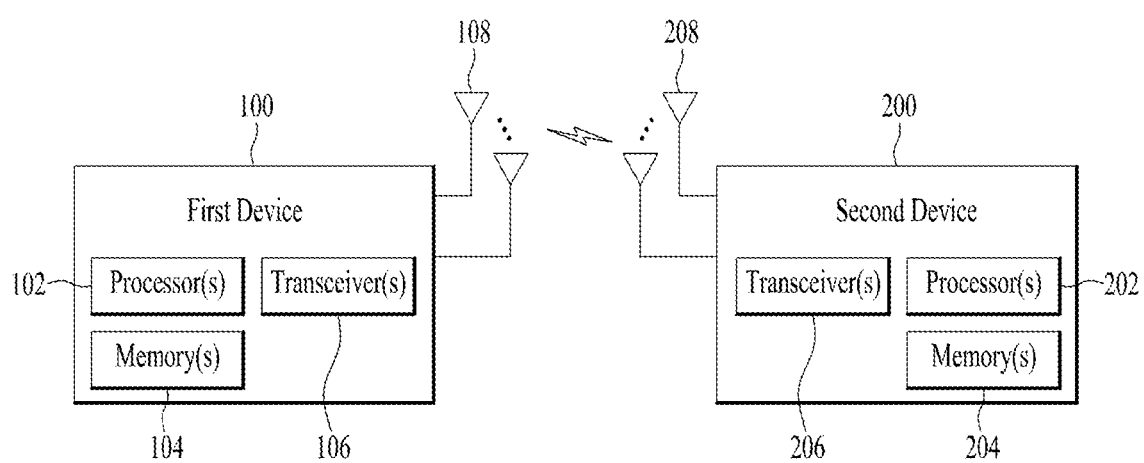

FIG. 28 illustrates wireless devices applicable to the present disclosure.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 27.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 29:
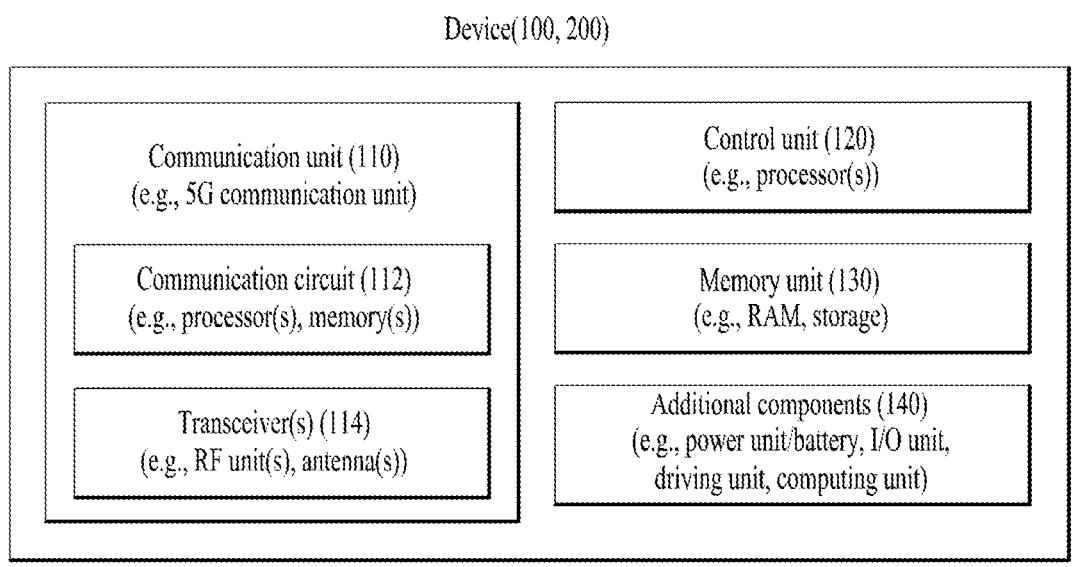

FIG. 29 illustrates another example of wireless devices applied to the present disclosure. The wireless devices may be implemented in various forms according to use-cases/services (refer to FIG. 27).

Referring to FIG. 29, wireless devices 100 and 200 may correspond to the wireless devices 100 and 200 of FIG. 28 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcasting terminal, a hologram device, a public safety device, an MTC device, a medicine device, a FinTech device (or a finance device), a security device, a climate/environment device, the AI server/device (400 of FIG. 27), the BSs (200 of FIG. 27), a network node, etc. The wireless device may be mobile or fixed according to a use-case/service.

In FIG. 29, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 29 will be described in detail with reference to the drawings.

Figure 30:
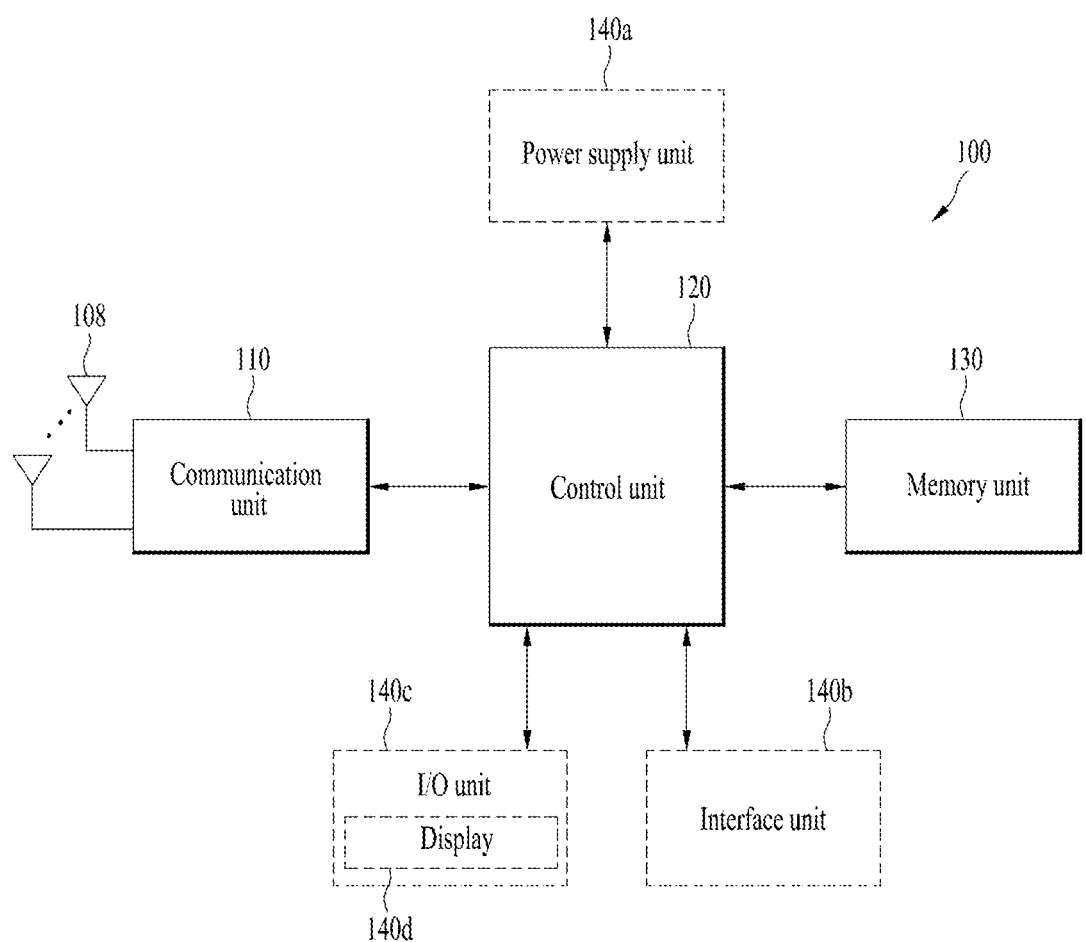

FIG. 30 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 30, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 29, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video)

input by a user, and store the acquired information/signals in the memory unit 130. The communication unit 110 may receive or output video information/signal, audio information/signal, data, and/or information input by the user. The I/O unit 140*c* may include a camera, a microphone, a user input unit, a display 140*d*, a speaker, and/or a haptic module.

For example, for data communication, the I/O unit 140*c* may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140*c*.

Figure 31:
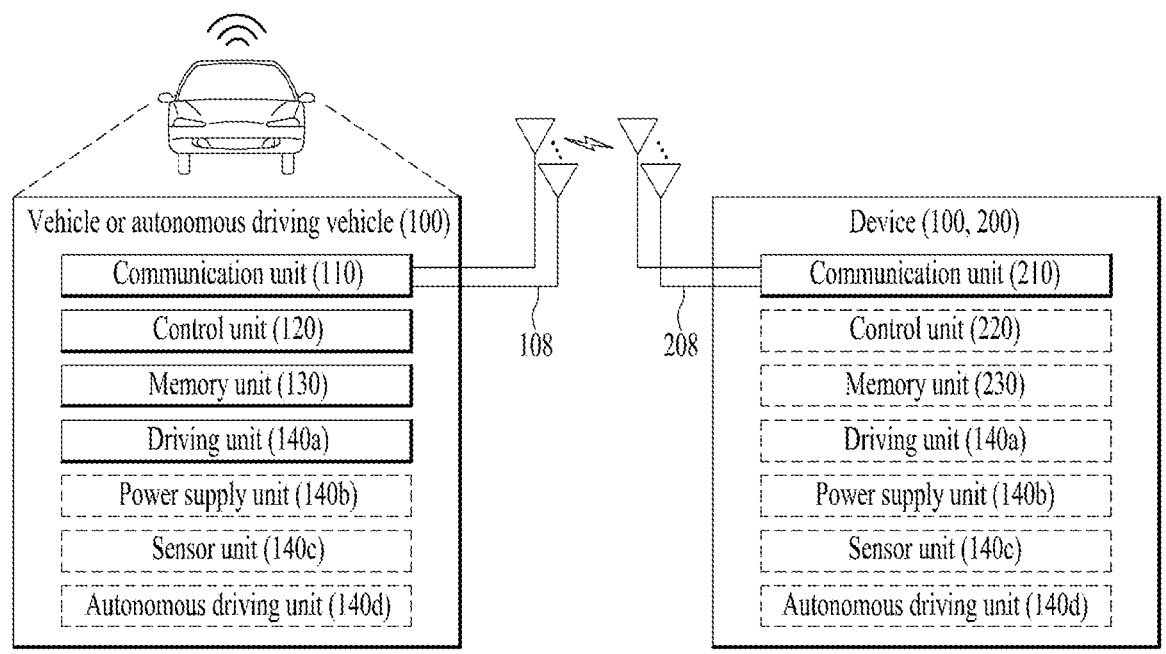

FIG. 31 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 31, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 29, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to travel on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire vehicle state information, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

Figure 32:
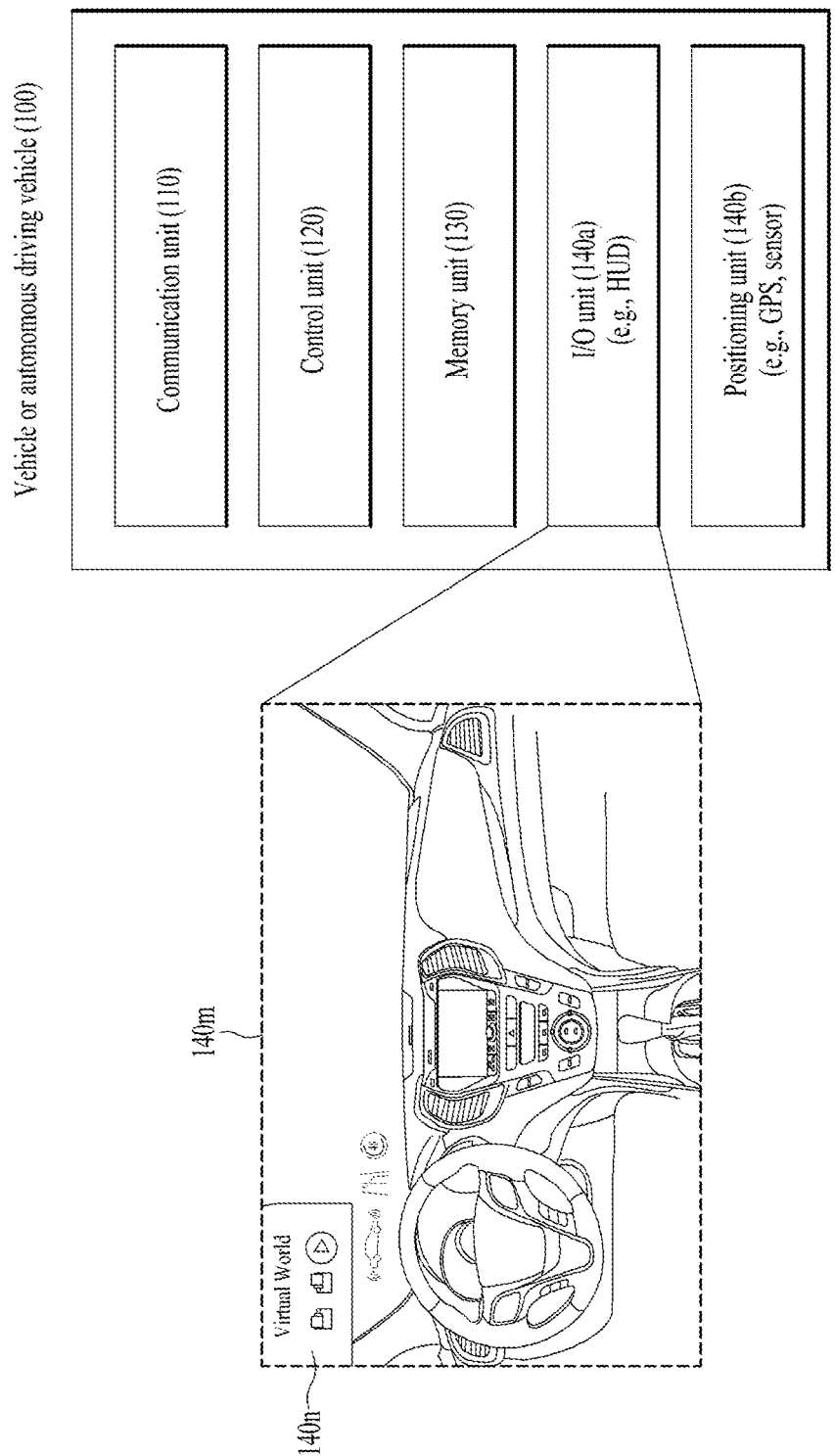

FIG. 32 illustrates an exemplary vehicle applied to the present disclosure. The vehicle may be configured as a transportation means, a train, an aircraft, a ship, or the like.

Referring to FIG. 32, a vehicle 100 may include a communication unit 110, a control unit 120, a memory unit 130, an I/O unit 140*a*, and a positioning unit 140*b*. The blocks 110 to 130/140*a* and 140*b* correspond to the blocks 110 to 130/140 of FIG. 29.

The communication unit 110 may transmit and receive signals (e.g., data, control signals, and so on) to and from external devices such as other vehicles or a BS. The control unit 120 may perform various operations by controlling the components of the vehicle 100. The memory unit 130 may store data/parameters/programs/code/commands supporting various functions of the vehicle 100. The I/O unit 140*a* may output an AR/VR object based on information in the memory unit 130. The I/O unit 140*a* may include an HUD. The positioning unit 140*b* may acquire position information about the vehicle 100. The position information may include absolute position information, information about a position within a lane, acceleration information, information about a position relative to a neighbor vehicle, and so on of the vehicle 100. The positioning unit 140*b* may include a GPS and various sensors.

For example, the communication unit 110 of the vehicle 100 may receive map information and traffic information from an external server and store the received information in the memory unit 130. The positioning unit 140*b* may acquire vehicle position information through the GPS and various sensors and store the acquired vehicle position information in the memory unit 130. The control unit 120 may generate a virtual object based on the map information, traffic information, and vehicle position information, and the I/O unit 140*a* may display the generated virtual object on a window in the vehicle (140*m* and 140*n*). Further, the control unit 120 may determine whether the vehicle 100 is traveling normally within a lane based on the vehicle position information. When the vehicle 100 is abnormally outside the lane, the control unit 120 may display a warning on a window in the vehicle via the I/O unit 140*a*. Further, the control unit 130 may broadcast a warning message about the abnormal driving to neighboring vehicles. Under circumstances, the control unit 120 may transmit position information about the vehicle and information about a driving/vehicle abnormality to an authority through the communication unit 110.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to wireless communication devices such as a user equipment (UE) and a base station (BS) operating in various wireless communication systems including 3GPP LTE/LTE-A/5G (or New RAT (NR)).

What is claimed is:

1. A method for receiving a paging signal by a user equipment (UE) in a wireless communication system supporting NarrowBand Internet of Things (NB-IoT), the method comprising:
determining index information indicating a wake up signal (WUS) group for the UE, wherein a WUS resource for the UE is selected based on the determined index information; and
monitoring a WUS for the UE based on the selected WUS resource,
wherein the index information indicating the WUS group for the UE is determined based on identification information of the UE, parameters related to a discontinuous reception (DRX) cycle of the UE, a sum of weights for paging carriers, and information about a number of UE groups for the WUS.

2. The method of claim 1, wherein the index information indicating the WUS group for the UE is determined based on the following equation, $$c_g = \text{floor}(UE\_ID/(N*N_S*W)) \bmod N_{SG}$$

where $c_g$ represents the index information indicating the WUS group for the UE, UE_ID represents the identification information of the UE, N and $N_s$ represent the parameters related to the DRX cycle of the UE, W represents the sum of the weights for paging carriers, and $N_{SG}$ represents the information about the number of UE groups for the WUS.

3. The method of claim 2, wherein the UE_ID is determined based on international mobile subscriber identity (IMSI) information of the UE,
wherein N is determined based on min(T, nB) and $N_s$ is determined based on max(1, nB/T) where T represents the DRX cycle of the UE, nB is indicated through system information, min(A, B) represents a smaller value among A and B, and max(A, B) represents a larger value among A and B, and
wherein the weights for paging carriers are determined based on the system information.

4. The method of claim 1, wherein the WUS resource includes a resource in at least one of a time domain, a frequency domain, or a code domain.

5. The method of claim 1, further comprising:
based on detecting the WUS, receiving the paging signal in a paging occasion related to the WUS.

6. The method of claim 1, wherein the index information indicating the WUS group for the UE hops over time.

7. The method of claim 6, wherein a hopping pattern for the index information indicating the WUS group for the UE is determined based on a system frame number (SFN).

8. A user equipment (UE) configured to receive a paging signal in a wireless communication system supporting NarrowBand Internet of Things (NB-IoT), the UE comprising:
a radio frequency (RF) transceiver; and
a processor operatively coupled to the RF transceiver,
wherein the processor is configured to determine index information indicating a wake-up signal (WUS) group for the UE, wherein a WUS resource for the UE is selected based on the determined index information, and to control the RF transceiver to monitor a WUS for the UE based on the selected WUS resource, and
wherein the index information indicating the WUS group for the UE is determined based on identification information of the UE, parameters related to a discontinuous reception (DRX) cycle of the UE, a sum of weights for paging carriers, and information about a number of UE groups for the WUS.

9. The UE of claim 8, wherein the index information indicating the WUS group for the UE is determined based on the following equation, $$c_g = \text{floor}(UE\_ID/(N*N_S*W)) \bmod N_{SG}$$

where $c_g$ represents the index information indicating the WUS group for the UE, UE_ID represents the identification information of the UE, N and $N_s$ represent the parameters related to the DRX cycle of the UE, W represents the sum of the weights for paging carriers, and $N_{SG}$ represents the information about the number of UE groups for the WUS.

10. The UE of claim 9, wherein the UE_ID is determined based on international mobile subscriber identity (IMSI) information of the UE,
wherein N is determined based on min(T, nB) and $N_s$ is determined based on max(1, nB/T) where T represents the DRX cycle of the UE, nB is indicated through system information, min(A, B) represents a smaller value among A and B, and max(A, B) represents a larger value among A and B, and
wherein the weights for paging carriers are determined based on the system information.

11. The UE of claim 8, wherein the WUS resource includes a resource in at least one of a time domain, a frequency domain, or a code domain.

12. The UE of claim 8, wherein the processor is further configured to, based on detecting the WUS, control the RF transceiver to receive the paging signal in a paging occasion related to the WUS.

13. The UE of claim 8, wherein the index information indicating the WUS group for the UE hops over time.

14. The UE of claim 13, wherein a hopping pattern for the index information indicating the WUS group for the UE is determined based on a system frame number (SFN).

15. An apparatus for a user equipment (UE) in a wireless communication system supporting NarrowBand Internet of Things (NB-IoT), the apparatus comprising:
a memory including executable codes; and
a processor operatively coupled to the memory,
wherein the processor is configured to perform specific operations by executing the executable codes, the specific operations comprising:

determining index information indicating a wake-up signal (WUS) group for the UE, wherein a WUS resource for the UE is selected based on the determined index information; and monitoring a WUS for the UE based on the selected WUS resource, wherein the index information indicating the WUS group for the UE is determined based on identification information of the UE, parameters related to a discontinuous reception (DRX) cycle of the UE, a sum of weights for paging carriers, and information about a number of UE groups for the WUS.

* * * * *